United States Patent
Wolff

(10) Patent No.: US 9,626,674 B1
(45) Date of Patent: Apr. 18, 2017

(54) SYSTEM AND METHOD FOR EXCHANGING, SHARING AND REDEEMING CREDITS

(76) Inventor: Gregory J. Wolff, Palo Alto, CA (US)

(*) Notice: Subject to any disclaimer, the term of this patent is extended or adjusted under 35 U.S.C. 154(b) by 2160 days.

(21) Appl. No.: 12/238,883

(22) Filed: Sep. 26, 2008

Related U.S. Application Data

(60) Provisional application No. 60/975,357, filed on Sep. 26, 2007.

(51) Int. Cl.
   G06Q 20/36 (2012.01)
   G06Q 20/38 (2012.01)

(52) U.S. Cl.
   CPC ......... *G06Q 20/3678* (2013.01); *G06Q 20/36* (2013.01); *G06Q 20/38* (2013.01)

(58) Field of Classification Search
   USPC ........................................ 705/64, 69
   See application file for complete search history.

(56) References Cited

U.S. PATENT DOCUMENTS

| | | | |
|---|---|---|---|
| 6,341,273 B1* | 1/2002 | Briscoe | 705/41 |
| 7,802,730 B2* | 9/2010 | Senda | 235/494 |
| 7,996,323 B2* | 8/2011 | Smith et al. | 705/63 |
| 2003/0208697 A1* | 11/2003 | Gardner | 713/202 |
| 2004/0264734 A1* | 12/2004 | Wakao | 382/100 |
| 2005/0067496 A1* | 3/2005 | Yen et al. | 235/462.08 |

* cited by examiner

*Primary Examiner* — Tsan-Yu J Huang
(74) *Attorney, Agent, or Firm* — Patent Law Works LLP

(57) ABSTRACT

An independently verifiable system and method for the exchange of a sequence of tokens corresponding to units of currency. A credit or unit of currency is represented by a digital image referred to as a graphical token which may be displayed on an electronic viewing device or printed on paper. Each token contains a digital code that uniquely identifies the previous graphical token in a series of exchanges. After generating a token, a first user provides that token to a second user in order to initiate an exchange. The second user may choose to verify the validity and currency of the token before accepting the token. Either user may choose to register the token and any parameters associated with the exchange with a registry system. Once a user accepts a token, they may choose to issue a new token in the sequence. They may also choose to redeem the token for the credit associated with a sequence of tokens.

14 Claims, 8 Drawing Sheets

SYSTEM AND METHOD FOR EXCHANGING, SHARING AND REDEEMING CREDITS

CROSS REFERENCE TO RELATED APPLICATIONS

This application claims priority under 35 U.S.C. §119(e) from U.S. Provisional Patent Application No. 60/975,357, titled "UnaBank—Better Service Futures," filed Sep. 26, 2007, which is incorporated by reference herein in its entirety.

BACKGROUND OF THE INVENTION

1. Field of the Invention

The present invention relates to systems and methods for trading credit or the types of currency in exchange for goods or services. In particular, the present invention provides a means to robustly track the exchange of credit and support multiparty exchanges wherein participants in the exchange may collectively or individually redeem credits.

2. Description of the Related Art

Existing currency systems are not well-suited to multiparty transactions or transactions that extend across a range of time. Existing currencies presuppose individual ownership of the currency such that physical possession of a currency token is sufficient to trade, redeem and otherwise control that unit of currency. Furthermore, currency exchanges do not maintain a history. Given an individual unit of currency it is generally impossible to follow the trading history for that specific unit of currency. These properties imply that some of the individuals in multiparty transactions or transactions that extend over a range of time bear some risk that one of the other parties will abscond with the currency.

To overcome these limitations, people may employ cumbersome escrow institutions and contracts. Including these third-party institutions in a transaction is expensive, inefficient, and inappropriate for everyday use.

Therefore what is needed is a system and methods for exchanging, sharing, and redeeming credits that overcomes the limitations of existing systems and efficiently supports multiparty and extended transactions.

SUMMARY OF THE INVENTION

The present invention overcomes the deficiencies and limitations of the prior art by providing an independently verifiable system and method for the exchange of a sequence of tokens corresponding to units of currency. In one embodiment, a credit or unit of currency is represented by a digital image referred to as a graphical token which may be displayed on an electronic viewing device or printed on paper. Each token contains a digital code that uniquely identifies the previous graphical token in a series of exchanges. In one embodiment the exchange system of the present invention comprises: a token generation module, a registry system, a verification module, a hash module, and one or more user systems. These systems and modules may be connected to a network for communication with each other. The user systems preferably include a content module for storing the image data associated with graphical tokens and a token generation module to create new tokens to be used in exchanges. After generating a token, a first user provides that token to a second user in order to initiate an exchange. The second user may choose to use the verification module verify the validity and currency of the token before accepting the token. Either user may choose to register the token and any parameters associated with the exchange with a registry system. Once a user accepts a token, they may choose to issue a new token in the sequence using the token generation module. They may also choose to redeem the token for the credit associated with a sequence of tokens.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
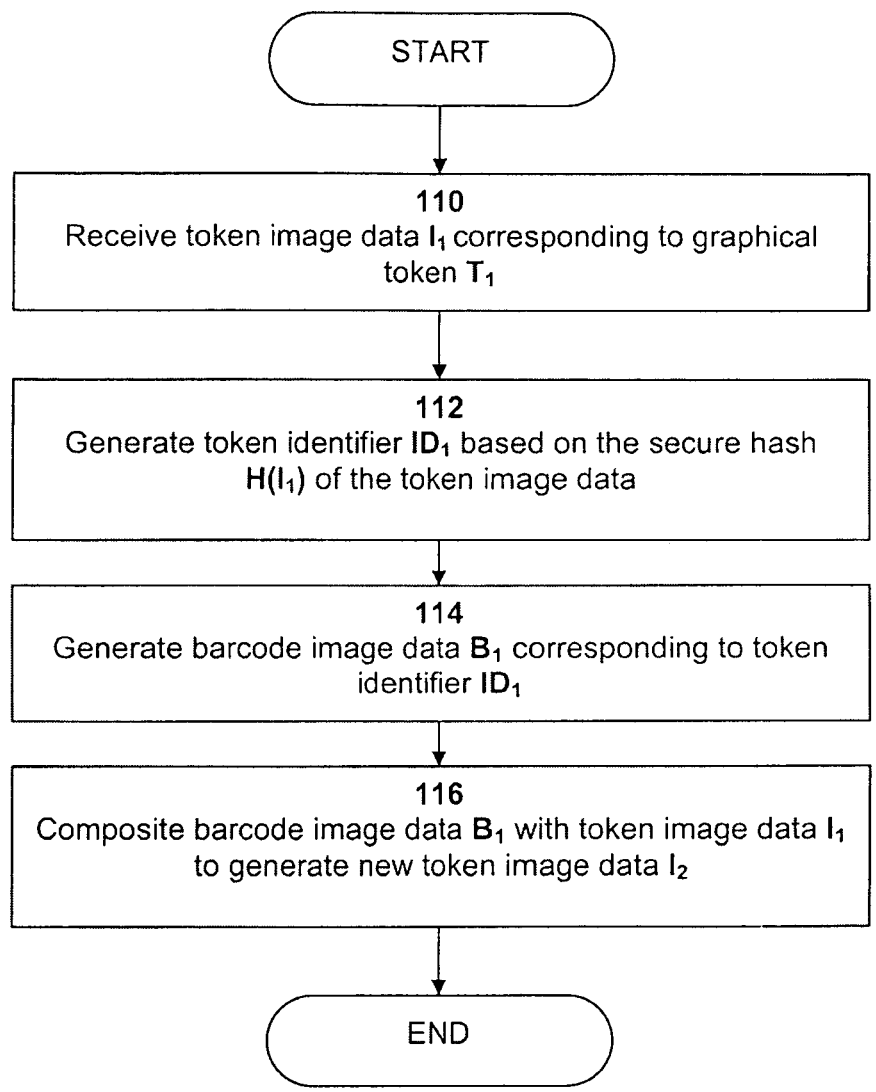
FIG. 1A is a flowchart of one embodiment of a method for generating a token according to the present invention.

An independently verifiable system and method for the exchange of a sequence of tokens are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

A system and method for the independently verifiable exchange of a sequence of tokens is described. More specifically, the present invention is a process implemented as a software solution that can operate on a wide variety of computing platforms. In the present invention a sequence of tokens is used by participants in one or more exchanges. The sequence itself represents a store of value which may be denominated in a currency. Alternatively the value of a sequence may correspond to reputation, promises of hours of labor, or some other measure of worth. The first token in a series comprises a unique digital image generated by an agent recognized within the community of exchange to have the authority to issue original tokens. This agent provides an initial value or backing for the sequence of tokens. In one embodiment, the token issued by the agent has a face value that corresponds to the amount of a national currency, such as the US dollar, which the agent has deposited into an escrow account to serve as the backing for the sequence of tokens. Each subsequent token is another digital image which contains a machine readable identifier, e.g. a barcode such as a QR Code, containing a unique identifier calculated as a function of the digital image of the previous token. In one embodiment, this function is a secure hash function, such as the SHA1 algorithm. Applying this function to the image data of the previous token creates a digital fingerprint unique to that image data. Embedding that fingerprint within a barcode included in the image of a token creates an immutable link from a token to the previous token in the sequence. This sequence can be independently verified by any party that has access to all of the images in this sequence simply by calculating the identifier, e.g. the hash, for each token, decoding the barcodes in each token to recover the embedded identifiers and then confirming for all tokens that the embedded identifiers for a token correspond to the calculated identifier for the previous token. To facilitate the exchange and verification of tokens, token holders may register tokens with a registry system which stores the image data associated with each token and allows that data to be retrieved by using the identifier for that token, e.g. the hash of the image data.

Generating a Token

Referring now to FIG. 1A, the operation of a token generation module is described. In one embodiment, this module operates locally on a user's computing device retrieving and storing token images to a local data store. In an alternate embodiment, this module operates on a Web server allowing users to upload and download token images using their web browser. To generate a new token, the token generation module receives in step 110 the token image data associated with the current token. In step 112, the token generation module calculates the unique identifier for the current token by computing the results of a function known as a secure hash algorithm applied to the image data. In one embodiment, this function is the SHA1 algorithm which is well known in the art.

In step 114, the token generation module then generates a digital image containing a barcode with the unique identifier for the current token. In one embodiment, this barcode is a QR Code™ from Denso Wave Incorporated.

The token generation module then creates a template image data stream that is a copy of the current token image data. In an alternate embodiment, this new image data stream can be a copy of a canonical template image for the sequence of currency associated containing the current token. In step 116 of FIG. 1A, the token generation module composites the digital image containing the barcode with the unique identifier for the current token onto the template image data stream to generate the image data for the new token. The new token image data is then sent back to the requestor. In one embodiment the token image data is also sent to the registry system using the HTTPS protocol.

Figure 1B:
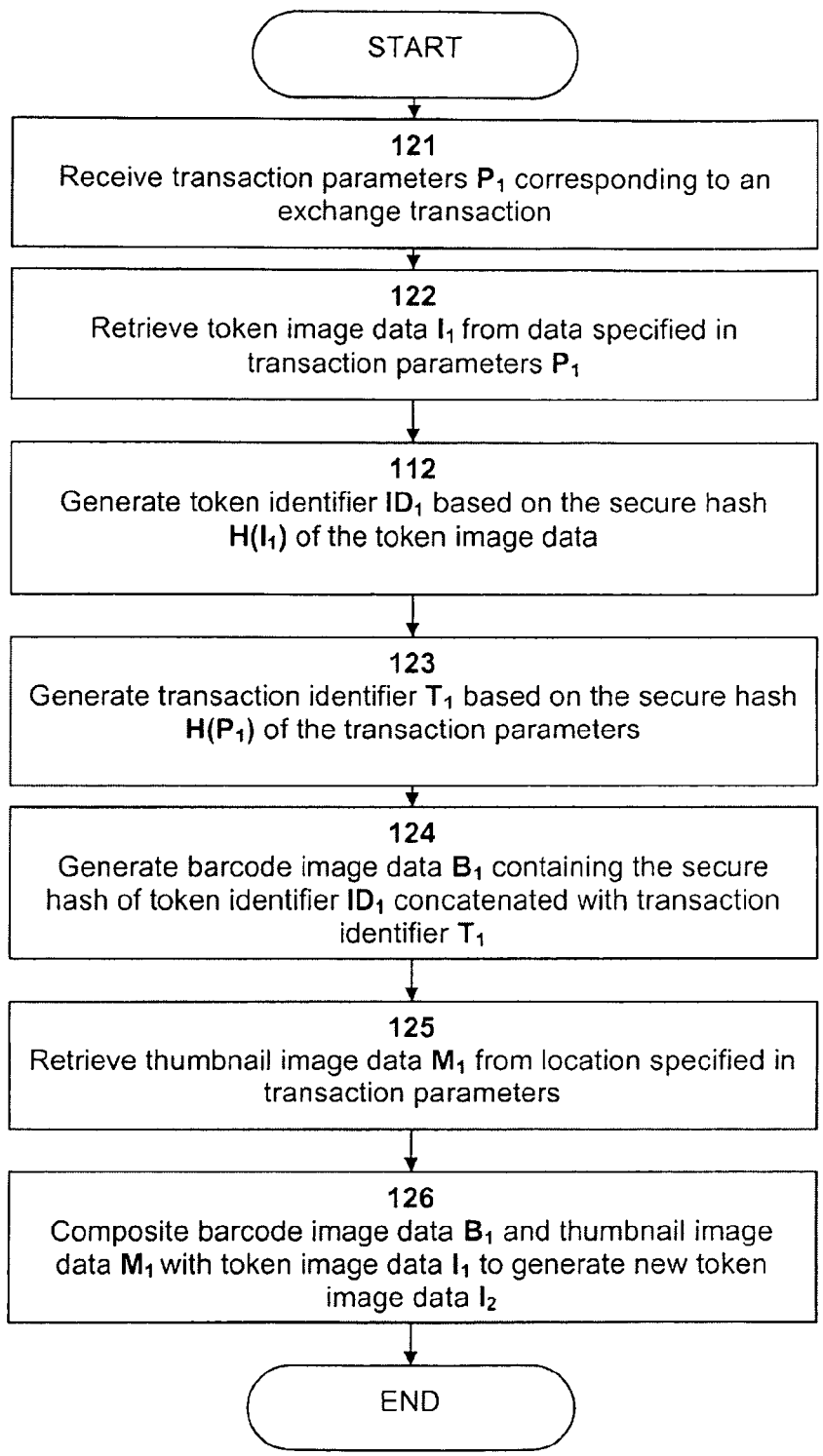
FIG. 1B is a flowchart of one embodiment of a method for generating a token containing transaction information according to the present invention.
Figure 2:
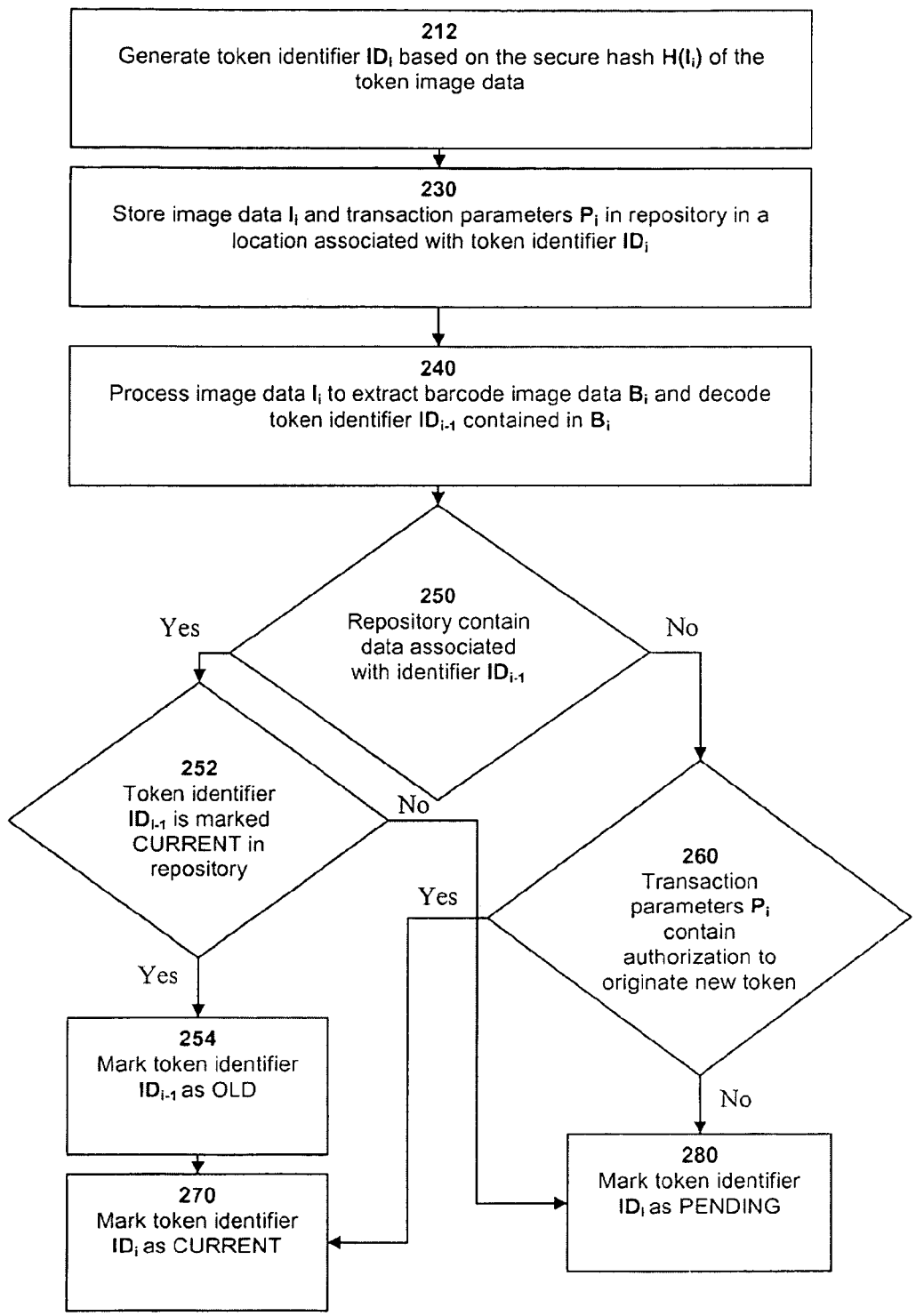
FIG. 2 is a flow chart of one embodiment of a method for registering a token according to the present invention.

FIG. 1B shows an alternate embodiment in which the token generation module generates tokens that reference the specific transaction grammars in addition to the previous token. In this embodiment, the token generation module receives a set of transaction parameters to be referenced by the new token as shown in step 121. These transaction parameters include a reference to the current token image data, such as a URL. In step 122 the token generation module uses the image data reference to retrieve the current token image data. In an alternate embodiment, this image data is supplied along with the transaction parameters.

As before, the unique identifier for the current token image is calculated using the secure hash function in step 112. In step 123, a transaction identifier is calculated. In one embodiment, this transaction identifier is decorated by applying a secure hash function, such as the SHA1 algorithm, to the transaction parameters.

In step 124, the unique identifier for the current token image and the transaction identifier are concatenated. In one embodiment, a new exchange identifier is generated by applying a secure hash function to these concatenated identifiers. This new exchange identifier is then encoded in a newly generated barcode image. In an alternate embodiment, the newly generated barcode image directly encodes the concatenated token image identifier and transaction identifier.

The token generation module may also create tokens that include information specific to an exchange and make it easier for humans to visually distinguish and verify the token images. In one embodiment, the transaction parameters include a reference to a thumbnail image to be included on the new token. This image might be, for example, a small picture of the older of the current token. In step 125, this thumbnail image data is retrieved and made available for compositing onto the new image data stream in addition to the archive image data in order to generate the new token image data.

Registering a Token

Once the image data for a token has been generated, the holder of a token may wish to register that token with a registry system in order to allow the token and any subsequent tokens to be easily validated by other parties. In one embodiment, the registry system allows individual token identifiers to be registered along with any transaction parameters associated with the exchange of that token.

Registration begins when the registry system receives the token image data and any associated transaction parameters. As before, the registry system computes the unique identifier for the token image data in step 212. The registry system then stores 230 that token image data and any associated transaction parameters in a storage module such as a local file system or database. The unique identifier for the token is used as a key for later retrieval of the image data and transaction grammars. For example on a computer running a version of the LINUX operating system, the image data might be stored in a file with a filename or path "/IMAGES/TOKENID" and the transaction data might be stored in a file with the filename "/TRANSACTIONS/TOKENID" where TOKENID represents the unique identifier associated with the token.

In order to facilitate rapid verification and redemption of token images, the registry maintains some additional information about registered tokens. In one embodiment, this additional information includes CURRENT, OLD, and PENDING markers which are stored in locations associated with the token identifiers. To determine the marker for the token being register, the registry system processes the token image data to extract the previous token identifier contained within the machine-readable identifier, e.g. a barcode, embedded within the token image data as shown in step 240. This previous token identifier should correspond to the unique identifier of the previous token in the sequence that was used to generated the token being registered.

If the previous token was registered with the registry, then the storage module should contain an entry for the previous token identifier. Using the example pathnames above, "/IMAGES/PREVTOKENID", where PREVTOKENID is the unique identifier of the previous token, should exist and contain the image data associated with the previous token. Step 250 checks the existences of this entry to see if the previous token has been registered.

If the previous token has been registered, the registry system retrieves the marker associated with the previous token in step 252. If that previous token is marked CURRENT, then the marker for the previous token is changed to OLD in step 254 and the marker for the token being register is set to CURRENT in step 270. Otherwise if the previous token has been registered but is not marked CURRENT, then the marker for the current token is set to PENDING. In one embodiment if the marker for the previous token is set to REDEEMED, then registration of the current token is not allowed and an error message is sent back in response to the request for registration.

If the previous token is not registered in step 250 or in the case where the token being registered does not contain any machine-readable identifier, then the registry system checks to see if the token is an authorized "original issue" token, in other words it checks to see if this token is an authorized start of a new token sequence. In step 260, the registry system examines the transaction parameters to see if they contain authorization for originating a new token. In one embodiment, this authorization consists of a digital signature using a private encryption key issued to a party trusted by the registry system.

If the token is an authorized a original issue, then the token is marked CURRENT in step 270, otherwise the token is marked as PENDING in step 280.

In one embodiment, the registry system maintains a list of all the tokens which are marked PENDING, for example by storing the token id of each such token in a file with pathname "/PENDING/PREVTOKENID" where PREVTOKENID is the identifier invented in the machine-readable data of the token image of the PENDING token. Whenever a token T is marked as CURRENT, the registry to see if there are any PENDING tokens with references to token T. If so, the registry marks T as OLD and marks each PENDING token as CURRENT. In one embodiment, the registry does not allow the registration of multiple children for any token, so an attempt to register a token will fail if the machine-readable code contained in the token image data of the token is PREVTOKENID and PREVTOKENID is encoded in the image data of an already registered token.

Since tokens may be used for many different types of exchanges, the registry system may accept and store many different types of transaction parameters. In one embodiment, the transaction parameters include an account ID for the current holder of the token, an account ID for the new holder of a token, and an authorization code to allow the registration. In one embodiment, the transaction parameters also include a representation of the additional currency that has been placed in escrow as part of the transaction associated with this token.

Verifying a Token

Figure 3:
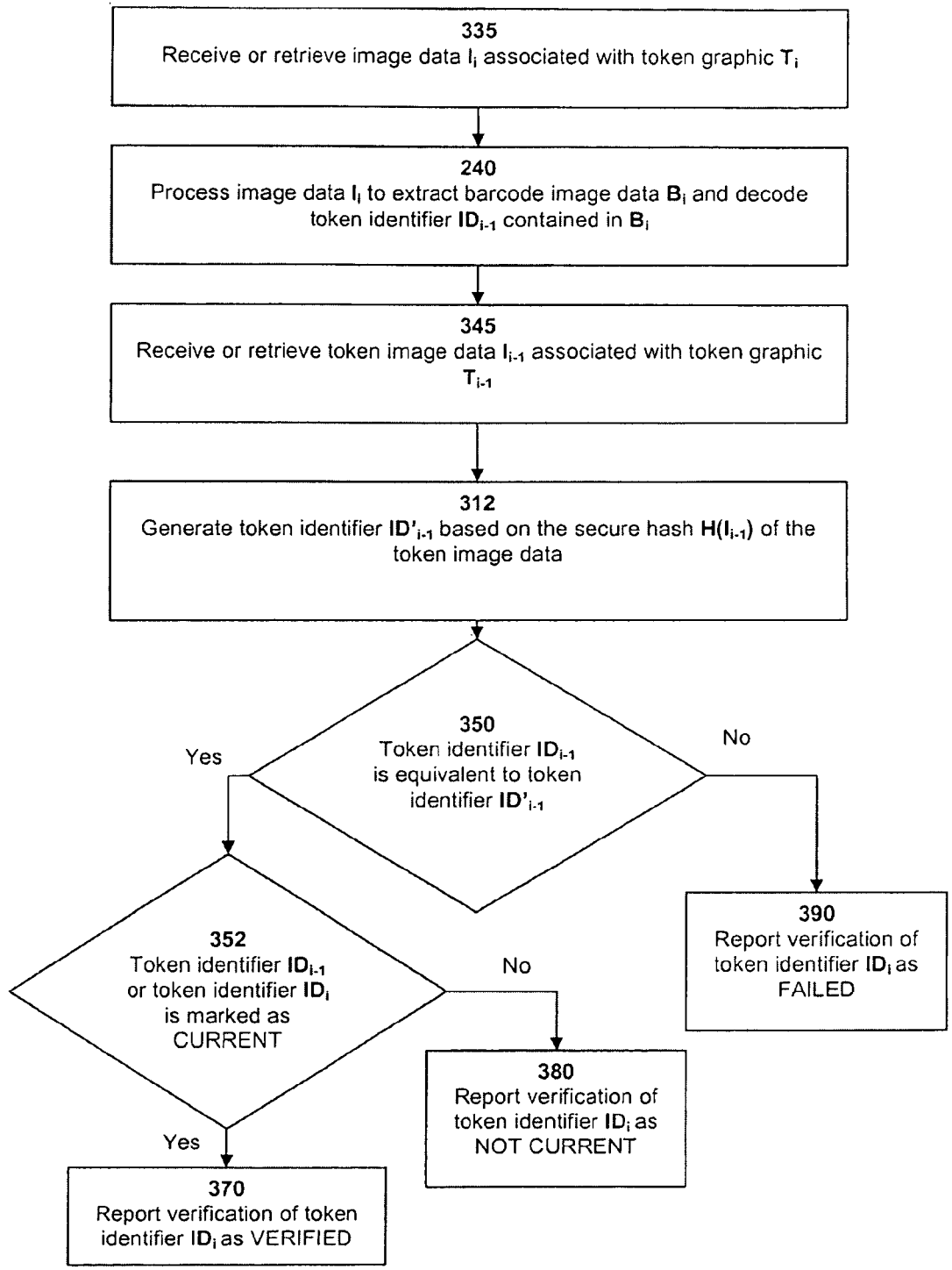
FIG. 3 is a flow chart of one embodiment of a method for verifying a token according to the present invention.
Figure 4:
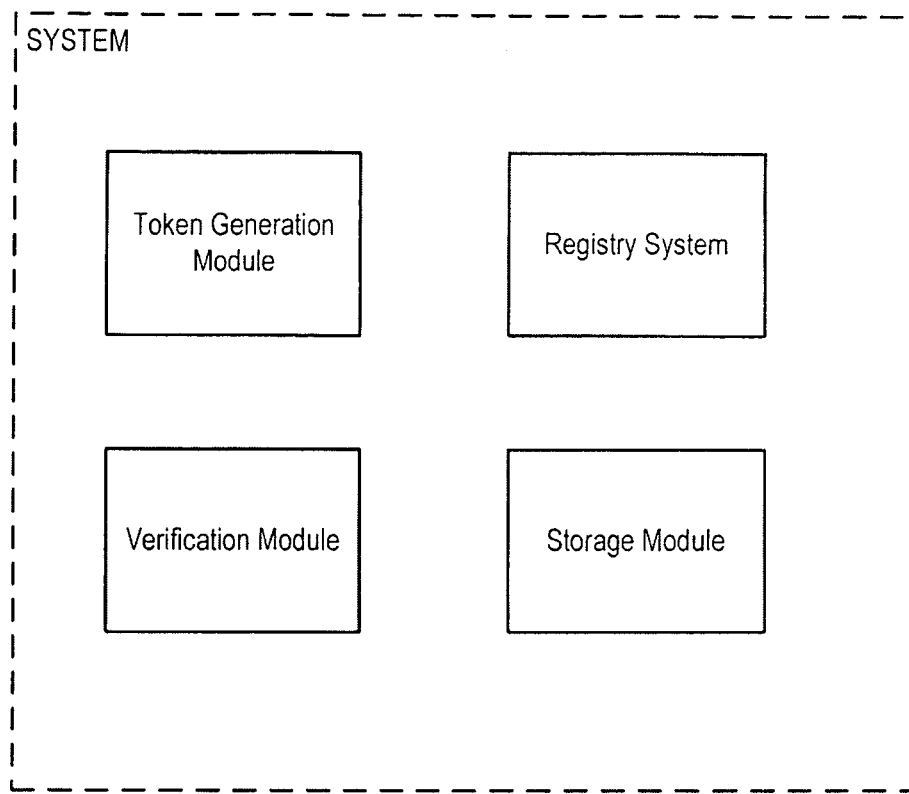
FIG. 4 is a block diagram of one embodiment of a system for exchanging, sharing and redeeming credits according to the present invention.

One key advantage of the present invention is the ability to independently verify a sequence of tokens. FIG. 3. is a flow chart of one embodiment for verifying a sequence of tokens given the image data corresponding to the tokens. The method shown in FIG. 3 assumes that the verification module has access to the markers associated with each token as stored in a registry system. The verification process might obtain this information by requesting them from the registry system using HTTP requests or other communication methods. In an alternate embodiment, the verification process first involves the creation of a registry of all of the token images provided for verification and then that registry system is used in the verification process.

To begin the verification process step 335, the verification module receives or retrieves image data associated with the token to be verified. The image data is then processed, step 240, to extract the machine-readable identifier encoded within the image data, the machine-readable identifier corresponding to the previous token identifier. For example a QR Code™ decoding algorithm is applied to the token image data.

The previous token identifier is used to retrieve 345 the previous token image data associated with that previous token identifier. If that previous token image data is not available, then the verification process fails. Assuming the previous token image data is available then the verification module confirms the integrity of the previous token image data, the unique identifier for that image data is calculated by applying the secure hash function in step 312. The output of that calculation is compared with the previous token identifier decoded from the image data of the token being verified in step 350. If those identifiers do not match the verification fails in step 390.

If the identifiers do match, then the marker associated with previous token identifier is retrieved in step 352. If that identifier is marked CURRENT, then the verification of the token succeeds in step 370. This means that the token image data being verified was generated based on a token that the registry considers valid and that the token image data may be registered as the next token in the sequence.

If the previous token identifier is not marked CURRENT, then the token being verified may not be accepted by the registry for registration and therefore the verification process reports 380 NOT CURRENT. This indicates that the token being verified is part of a sequence of tokens but may not be able to be registered either because the token has already been registered or another token has been registered which has the same previous token identifier encoded in the image data for that other token.

In another embodiment, the verification process begins with a set of token images, and one or more of which are designated as "original" token images. For each token image to be verified, the verification module extracts the previous token identifier as in step 240, retrieves the previous token image. If no previous token identifier can be extracted or there is no image in the set of token images having that identifier, then the verification process reports a failure for the token being verified. If the previous token image is found within the set and is labeled as original, the verification process reports success for the token being verified, otherwise if the previous token image is found within the set then these steps are repeated for that previous token image.

Another advantage of the present invention is the ability to print the token graphics on paper or display them on a viewing screen and readily verify the tokens using an independent imaging system. In one embodiment, an imaging system such as a digital camera is used to create an image data stream which is processed as in step 240 to extract the machine-readable ID, e.g. using a QR Code decoder that corresponds to the previous token in the sequence. Note that if the printed token has already been registered, then the previous token referenced by the printed token will be marked as OLD allowing the verifier to confirm that the printed token is part of a sequence originating with a verified token. This may be useful as part of an audit of a series of transactions.

If the previous token referenced by the printed token is marked as CURRENT, then the holder of the token knows that they can use the printed token to generate a new token image and register that new token image. This provides a mechanism for exchanging tokens via paper. Note that in systems which only allow any registered token to have only one child token, e.g. systems which enforce a single sequence with no branching, the potential exists for a race condition to occur. In that race condition, a token image which was previously verified as referencing a CURRENT token, Q, may be prevented from being registered because another token image referencing Q may have been registered causing the marker for Q to change to OLD. To avoid such race conditions, authentication mechanisms such as passwords may be used in conjunction with the token registration. In one embodiment, the transaction parameters for a previous token image contain the hash of a password to be provided upon registration of the subsequent token image. Before registering the subsequent token image, the registry system checks the transaction details supplied with the subsequent token image for a password, calculates the hash of that password and registers the subsequent token image if and only if the password is included in the transaction details of the subsequent token and the hash of the password matches the hash provided in the transaction details of the previous token.

In another embodiment, the transaction parameters associated with a token X include contact information for the token holder. This contact information might include e-mail address or mobile phone number. When the registry receives a request to register a token subsequent to token X, the registry sends a unique, secret code in a request to the contact information included in the transaction parameters for token X. The registration for the subsequent token is marked PENDING until the code is received. In an alternate embodiment, the PENDING registration is automatically accepted unless a code sent to the contact information for X is received within a specified deadline. These approaches allow great decrease of flexibility in the exchange of tokens while maintaining the integrity and independent verifiability of the sequence of exchanges.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

Appendix A

UnaBank - Better Service Futures

Author: Greg Wolff
September 24, 2007

Abstract: A new banking model for the service economy ............................................................. 19
UnaBank Part I  Overview and Goals  Exchanging and accounting for quality services ............. 20
    The Need for better Service Exchange mechanisms ............................................................. 20
    The UnaBank Approach ........................................................................................................ 23
    Key Steps in Issuing, Exchanging, and Redeeming Credits ................................................. 26
UnaBank Part II  Implementation details  Issuing, Transferring, and Redeeming Credits .......... 29
    Introduction ........................................................................................................................... 29
    Terminology and Notation .................................................................................................... 30
    Issuing, Exchanging, and Redeeming Credit ....................................................................... 31
    Methods of Transferring Tokens and Validating Credits ..................................................... 35
    Verification and Dispute Resolution ..................................................................................... 37
    Sponsored Credits ................................................................................................................. 38
UnaBank Part III  Use cases and application scenarios ................................................................ 40
    Improving the quality of exchange ....................................................................................... 40
    Conclusion ............................................................................................................................ 45
UnaBank Appendix ....................................................................................................................... 47

*Tags: UnaCredits, Tips,
Social Capital, Service Exchange, Service Economy*

Abstract: A new banking model for the service economy

UnaBank facilitates the delivery of high-quality services through a system of *service exchange¹*. In brief, the system works as follows:

- Individuals or institutions deposit funds with UnaBank in exchange for UnaCredits
- Those credits are used in trades for services and goods
- 501(c)3's and other *qualified public service organizations* redeem those credits in exchange for the original deposits This model combines the best elements of traditional currency systems, escrow services, and charitable donations to give individual stakeholders a stronger voice in determining the priorities of service institutions. The model also facilitates dynamic allocation of resources to those services in highest demand. The relative importance and quality of services provided by organizations should be correlated with the flow of UnaCredits to the organization.

By increasing the efficiency of resource allocation, the use of UnaCredits, should increase the pace of wealth creation in service-based economies. By aggregating information regarding individual choices, a "social service index" which measures the value and volume of UnaCredit exchanges, gives participants and policymakers better information regarding the relative service quality and public demand. In addition, the service exchange mechanism creates a direct link between funding and the provision of services to increase funding of public services proportional to demand.

UnaBank utilizes a unique accounting system to minimize the transaction costs associated with issuing, exchanging, and redeeming credits. UnaBank credits may be securely exchanged online, via mobile phones, or via paper. Regardless of the medium, UnaCredits provide a very efficient and distributed mechanism for tracking the history of individual credits. This history simultaneously serves as a record of transactions and an audit trail of the exchanges. As such, the history facilitates the delivery of *value added services* associated with interactions. Payment for these transaction services, include linkages to information relevant to specific transactions and may be used to offset the costs of operating exchange and help subsidize the associated public services.

The first part of this paper describes the overall system of service exchange. The second part details the implementation of the robust accounting methods used by UnaBank. The final section provides some usage examples and links to related work. The appendix includes a diagram of the system operation and a glossary of terms.

---

[1] See the Appendix for a glossary of terms.

UnaBank Part I
Overview and Goals
Exchanging and accounting for quality services

The Need for better Service Exchange mechanisms

Many citizens of both wealthy and poor countries lack access to high-quality education and health services. The world's largest economy, the US, spends over 15% of its GDP on health care yet more than 15% of US residents do not have health insurance. The US does provide universal education, however many schools in the US still suffer from high rates of crime and poor performance. In other countries, quality schools and teachers may not be available or affordable to all residents.

Advances in technology stand in sharp contrast to the current situation for social services. As referenced above, increased spending on public services does not necessarily improve quality or availability of health care and education. Rapid advances in technology demonstrate the opposite phenomenon. Costs continue to fall while the utilities of the technology continue to increase. Even low wage earners in many countries can now afford televisions, mobile phones, or the latest video games that outperform expensive models purchased just a few years ago.

This disparity between advancing technology and deteriorating social services creates strain on our societies by increasing the gap between expectations and day to day experiences. As individuals learn what should be possible with modern technology, they become even more frustrated and unhappy with the slow progress in the quality and level of services they receive.

On the other hand, the rapid innovations in technology may create opportunities for radical improvements in services. Is it possible to apply the lessons of technology innovation to increase the availability and quality of public services? Can entrepreneurial activities create safe schools for children, treatments for curable diseases, clean water, and other basic services? Based on the recent successes of new social enterprises, the answer appears to be a qualified yes. Simply copying models of technology innovation does not work well for the service sector for reasons explained below. On the other hand, successful projects have demonstrated ways in which information technology lowers costs and speed innovation in social services. The UnaBank model described here attempts to codify these learnings into a more formal market mechanism for service exchange.

Why services don't scale

Many have tried (and many have failed) to improve services by emulating industrial era manufacturing companies that gain efficiencies through economies of scale. For a technology product, this works well because every person purchases essentially the same product. Every telephone handset works identically to every other telephone handset. In contrast, every public service differs according to the individuals involved and their context. Each relationship between a teacher and a student, or a doctor and a patient depends on the unique personalities and relationships of the people delivering and benefiting from the service. Insensitive attempts to create economies of scale by ignoring these differences tend to reduce the quality of the experiences for both providers and beneficiaries.

Others have attempted to use market mechanisms that rely on the dynamics of supply and demand to drive investment and innovation through pricing incentives. Unfortunately the assumptions underlying these models of scarcity and competition do not align well with the realities of public services. Social services generally fall into the category of public goods. Delivery of services requires access to public knowledge. Artificially limiting access to that knowledge (restricting supply of a resource which can be copied at zero cost) directly detracts from the ability to deliver services. On the demand side, healthcare, education, and other public services qualify as necessities not discretionary purchases.

These and other factors have limited the applicability and effectiveness of market mechanisms for service innovation. While the industrial era model of markets has created tremendous wealth, adapting these mechanisms to service innovation has met with limited success.

3 keys to service innovation

This paper proposes three fundamental differences between social services and technology production that help explain why existing markets fail to create high-quality, widely accessible social services. These differences suggest a number of alternatives or variations on existing market mechanisms that promise to be more effective in driving service innovation. One such model, the UnaBank service exchange, is described in detail and used to illustrate various examples.

Table 1 Key differences between the production of industrial goods and delivery of social services

|  | Technology<br>Exchanging physical goods | Services<br>Sharing information and knowledge |
| --- | --- | --- |
| Notion of exchange | Private consumption<br>goods and resources | Creation of experiences<br>Learning and doing |
| Main challenge to be solved by society | Allocation of distributed resources | Allocation of distributed attention |
| Dynamics & benefit to society | Competing to increase supply of resources | Cooperating to improve quality of experiences |

Private consumption versus shared creation

The industrial economy revolves around the manufacture and consumption of physical items. An individual loaf of bread is made by a baker to be consumed by a customer. The acts of production and consumption are inherently separate. The value of the exchange lays in the object itself, in this case a loaf of bread.

The service economy, by contrast, revolves around the interaction between parties. It may or may not involve physical artifacts. Tutoring a student requires, by definition, a tight coupling of "production" and "consumption." The act of tutoring simultaneously "creates" the experience and "consumes" the attention of the teacher and the student.

People communicate and respond to each other in many unpredictable ways. Because of this, the quality of a social service depends on both the giver (teacher) and the receiver (student) and the nature of their interaction. Manufactured goods do not have this dependence on the receiver. Different people may have different tastes, but the loaf of bread does not change depending on the eater. Once the bread has been baked, anyone eating that bread would be getting exactly the same product as anyone else. Because people respond to each other in unpredictable ways, every service interaction differs to a greater or lesser extent from other interactions. Furthermore, both the provider and the beneficiary participating in the interaction and both may learn and benefit from the exchange. The reciprocal nature of this relationship creates incentives for cooperation unlike the typical asymmetric and competitive situation for producers and consumers of manufactured goods.

Allocating resources vs. allocating attention

Industrial economists introduced the notion of *capital asset* to denote the means of producing goods. Market mechanisms enable the packaging and trading of these assets also known as resources. A free-market enables producers to acquire all the assets necessary to produce a good. Dynamic markets which attempt to balance supply and demand facilitate the employment of assets to their most useful purposes as determined by demand in the marketplace.

Unfortunately social relations cannot be so easily bundled into packages and exchanged in a market. Just as a caring teacher cannot be separated from the act of teaching, knowledge cannot be segmented or traded separately from the holder of the knowledge.

Attention itself is not a fungible resource. One person's attention cannot be aggregated, combined, stored, or traded the way one might trade land, cattle, or ovens for baking bread.

People cannot save or spend attention the way they use money and other assets. On the contrary, each person has an identical, fixed amount of attention that they "spend" at a constant rate[2]. Likewise demand for basic services cannot easily be accommodated through markets driven by pricing signals. Access to clean water, safe schools, life-saving drugs, etc., are necessities of life – things which most people consider to be priceless.

And furthermore, intangible resources, ideas, digital recordings, and the like have no natural limits on their supply. Hence these intangibles or "non-rivalrous" goods which can be copied at zero marginal cost and do not fit the assumptions of scarcity built into the current market

---

[2] Of course the "quality of attention," however defined, may change or vary between individuals but that only goes to further the distinction between attention and the industrial notion of assets.

mechanisms. In short, the fundamental approach of "balancing" supply and demand breaks down when applied to these key ingredients of social services.

Competing to produce goods versus cooperating to create better experiences

Competitive markets do a fantastic job of allocating resources by dynamically balancing supply and demand of physical goods and resource. As described above, knowledge-based services violate many of the assumptions underlying this approach of balancing supply and demand. Recognizing this fact, how should society as a group manage the provision of services?

This paper argues that members of society have a shared interest in improving the quality of services. Unlike tangible goods, where markets address the critical need to increase the supply of scarce resources, market mechanisms for services should address the critical need to improve the quality of experiences for all participants. To say it another way, attention is a fixed "resource." Nobody can manufacture more attention. However it is possible to increase the "return on attention" by improving the quality of attention, or more specifically the quality of the experiences to which people devote attention. Learning and sharing experiences is a primary means for improving the quality of future experiences for both ourselves and others.

In practical terms this means that society benefits by increasing the value of exchange for both parties. Doctor and patient should have strong incentives to make their interactions as valuable to each other as possible. Unlike competitive pricing situations, where both seller and buyer have strong incentives to withhold information, service markets do best when the interest of participants have incentives to fully disclose information and create the best possible experience for both sides.

Typical markets structure transactions as "zero-sum" interactions. Any gains to one party come at the direct expense of the other party. Service exchange needs a different pricing model that recognizes and encourages the exchange of information for mutual gain. The UnaBank approach provides one such model.

The UnaBank Approach

To illustrate the UnaBank approach, consider the practice of tipping. Tipping represents a "positive-sum" game. Most people enjoy a good meal with great service more than the same food delivered by an uncaring or surly waiter or waitress. Considering only the food, there may be no visible difference as long as the food reaches the customer and they go home with a full stomach. On the other hand, everyone instinctively knows the difference between a good experience and a bad experience.

Good service usually earns a good tip which indicates the value of the experience itself. In one sense, the UnaBank system of a currency backed by social services may be viewed as a tool to build upon and extend the cultural tradition of tipping. As the quality of the service experience improves, the value of the currency rises and benefits all stakeholders. Before describing the mechanisms and system of incentives in detail, let's take a closer look at the practice of tipping.

Tipping by design

When dining in a full service restaurant in North America, the common practice calls for leaving a gratuity in appreciation for the server. While customs vary, the gratuity generally runs proportional to the bill for the meal; better service means better experience, which means a larger tip.

In California, patrons tip an average of approximately 15% of the cost of the meal with that rising to 20% or more for excellent service and dropping to 10% at the other extreme. Leaving no tip at all would be considered an insult.

The practice of tipping gives us a starting point for considering market mechanisms appropriate to a service economy. The custom of giving gratuities for good service benefits all parties by:
- aligning the interests of the provider (server) with the beneficiary (customer)
- provides direct feedback on the quality of the experience
- complements the pricing and exchange of physical goods (the meal)

The UnaBank approach builds upon common cultural practices such as tipping and informal barter, extending the principles of these practices to facilitate local control and build social capital. In doing so, great consideration must be given to protecting and fostering the critical emotional and social aspects which cannot be replaced by any mechanical process. We seek to build tools that facilitate – not replace -- human interaction.

Returning to the restaurant example, one might ask how to improve the system of tipping to generate greater value for patrons and servers alike. Imagine a situation in which customers know in advance the average tip received by each server in the restaurant. Given this knowledge, customers might request to reserve a table with a particular server. Lower earning servers could immediately see their relative position and perhaps begin emulating more highly tipped wait staff in an effort to improve their own performance.

This admittedly contrived example illustrates the power of aggregation to improve the decision-making capabilities of individuals. A public index of restaurant gratuities may or may not be a good idea. However, a public index driven by individual choices that rates clinics and schools based on the quality of the experiences they create for community members would be tremendously helpful for many stakeholders, including those receiving care, those giving care, and policymakers.

Roughly speaking, here's how the UnaBank approach maps onto the tipping example:
- UnaBank issues UnaCredits
- People exchange UnaCredits for services (e.g. tips)
- Service providers redeem UnaCredits for Cash
- UnaBank publishes a "Service Index" ranking providers by the amount of UnaCredits they have received which should be an indicator of the quality of the service experience.

UnaBank Service Exchange outline

The UnaBank service exchange takes advantage of information technology to redraw the boundaries between pricing, transacting, and accounting of exchange. Unlike market-based transactions of physical goods, services do not rely on the physical movement of tangible goods. Furthermore, service experiences vary widely depending on both parties in an exchange; hence pricing services differs greatly from pricing commodities.

In a typical service exchange, the exchange happens first – i.e. the service is performed -- before the final price is set. To avoid disputes, the formula for determining the price may be set in advance, such as dollars per hour or some percentage of a related transaction as in the tipping case. Once the service has been performed, the price is finalized and payment occurs. (This list represents some of the possibilities, not an attempt to create an exhaustive list. Other models include ongoing retainers or fixed-price contracts.) Sometime after the transaction, both sides perform internal accounting and auditing functions to reconcile their books and manage their balance of accounts.

In the UnaBank approach, the service exchange begins with a buyer giving a token representing an UnaCredit to a seller (service provider), then comes the performance of the service, and finally the "registration" of the service provider as the new holder of the UnaCredit.

Each UnaCredit carries both a "face value" and "social value." The face value or denomination of the credit corresponds to the amount of hard currency deposited with the UnaBank and held in escrow for the credit. The social value consists of links and trading history that carries the stories of services and service experiences provided in exchange for this credit. Taken together, the combination of face value and social value represents the full value of the exchange to both parties. This history of exchange also serves as an automatic accounting mechanism for exchanges involving UnaCredit. These accounts can be independently verified by anyone with access to the public registry and serves to create additional trust in the system and amongst participants.

In summary, here are the highlights of how the UnaBank service exchange differs from the standard market models:
- Escrow backed currency - UnaCredits are used as the full or partial payment for an exchange
    - Exchanged via a graphical token (digital image or printed card)
    - Backed by escrow funds held by UnaBank
    - Can be used for any purpose with any willing parties
- Experience based pricing - Full price includes face value and social value of UnaCredits
    - Buyer may add stories and / or face value based on quality of service experience
    - Token serves as currency of both cash and reputation where the history of exchanges serves as a partial indicator of the holder's position in the community
    - Visible index of aggregated value helps inform others enabling them to select experiences that best fit their needs
- Immediate, public accounting - Token holder can register exchange; Service provider can redeem UnaCredit for full escrowed value

- Secure, reliable history of registered exchanges remains publicly visible and auditable[3]
- Token Identifier acts as secure, digital receipt for interoperability with existing accounting systems The remainder of this section provides a bit more detail on UnaCredit and walks through the basic steps in issuing, exchanging and redeeming credits. See Part II for a full description and implementation details.

*UnaCredits - the basic unit for both exchange and accounting*

The UnaBank accounting system associates an independently verifiable history with each circulating credit. The history of each credit is represented by a sequence of tokens. Each token consists of the original credit identifier, an owner of record, and an immutable reference to the previous instance of the token. A particular credit may be redeemed by presenting to the UnaBank a valid token consistent with the most recently registered token for that credit. See Figure 1 for an overview of token exchange.

Each token may be represented as a digital image. Tokens may be transferred by creating a new version of the image containing the new owner of record and a reference to the current token. Registering the new token with the UnaBank validates the transfer of ownership.

Given a token, anyone can verify the history of the associated credit that is the sequence of tokens. To facilitate validation and trust, registered tokens are permanently stored on the UnaBank website and can be retrieved using an immutable reference in the form of a hash digest computed based on the token, that is the digital data corresponding to the image.

Key Steps in Issuing, Exchanging, and Redeeming Credits

1. Issuing
   Depositor requests a new credit with specific or assigned CREDIT_ID
   A token image (TOKEN$_0$) for that credit is generated, the image containing the specific CREDIT_ID and depositor identifier, the OWNER_ID

TOKEN_ID$_0$ (the hash of the original token image) is registered with the UnaBank for that CREDIT_ID

2. Exchange
   A new token image TOKEN$_1$ is created that contains the CREDIT_ID, the TOKEN_ID$_0$, and the new OWNER_ID$_1$

TOKEN_ID$_1$ (the hash of the new token image) is generated

TOKEN$_1$ is sent to the new owner, OWNER_ID$_1$

---

[3] This applies only to the record of the exchange. Details of the transactions including personally identifying information may be available only to parties of the exchange.

The exchange is registered by sending TOKEN$_0$ and TOKEN_ID$_1$ to the UnaBank which performs the following steps:

> Retrieved the currently registered token ID, TOKEN_ID$_c$, for CREDIT_ID
> If TOKEN_ID$_0$ = TOKEN_ID$_c$ (stored by UnaBank) and
>   TOKEN_ID$_0$ is equal to the hash of TOKEN$_0$
> Then store TOKEN_ID$_1$ as the currently registered token ID for CREDIT_ID

3. Redemption
    TOKEN$_N$ is sent to the UnaBank along with a request for redemption
    > Assuming the hash of TOKEN$_N$ is the currently registered ID for CREDIT_ID, the corresponding amount is credited to the account of the owner of record listed in the transaction details associated with TOKEN$_N$

CREDIT_ID is set as having been redeemed

Note that the owner of record may be confirmed by manual inspection of the token image and that the history of the credit (sequence of registered tokens) may be validated before accepting the redemption. An optional set of transaction details may be specified at token generation time. These may include private passwords or other authentication information required to register a new token. As an additional safeguard, the original registered owner or others may be notified of the redemption and given an opportunity to dispute the register transactions as fraudulent.

Figure 5:
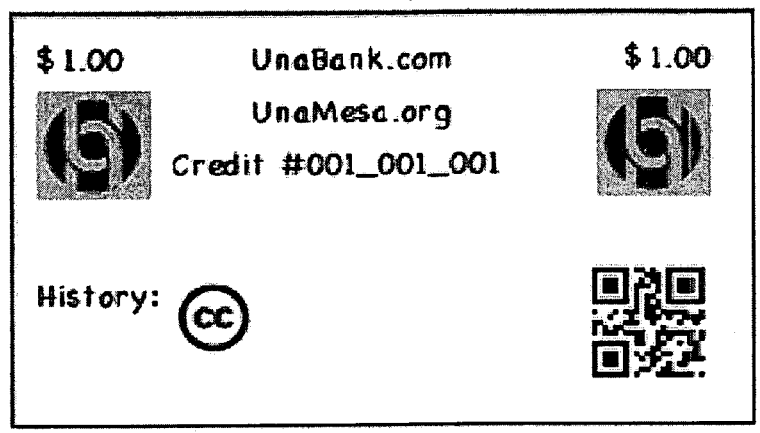
FIG. 5 is a graphical representation of example tokens according to the present invention.
Figure 5:
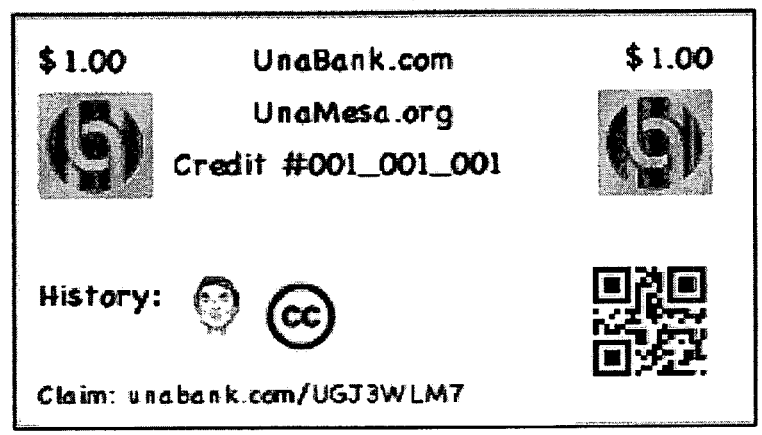
Figure 5:
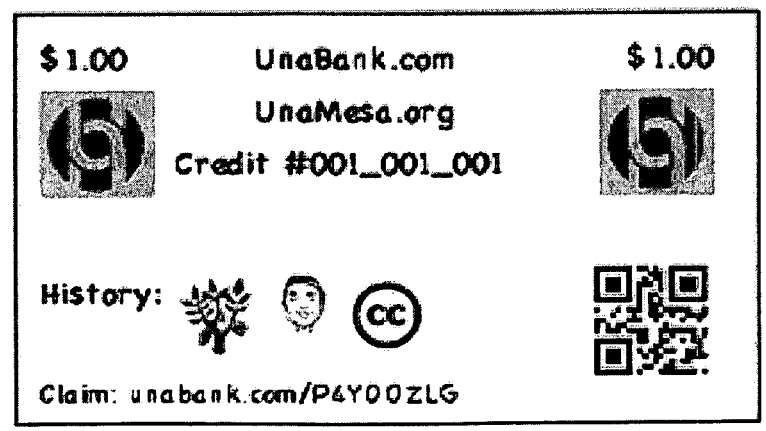
Figure 6:
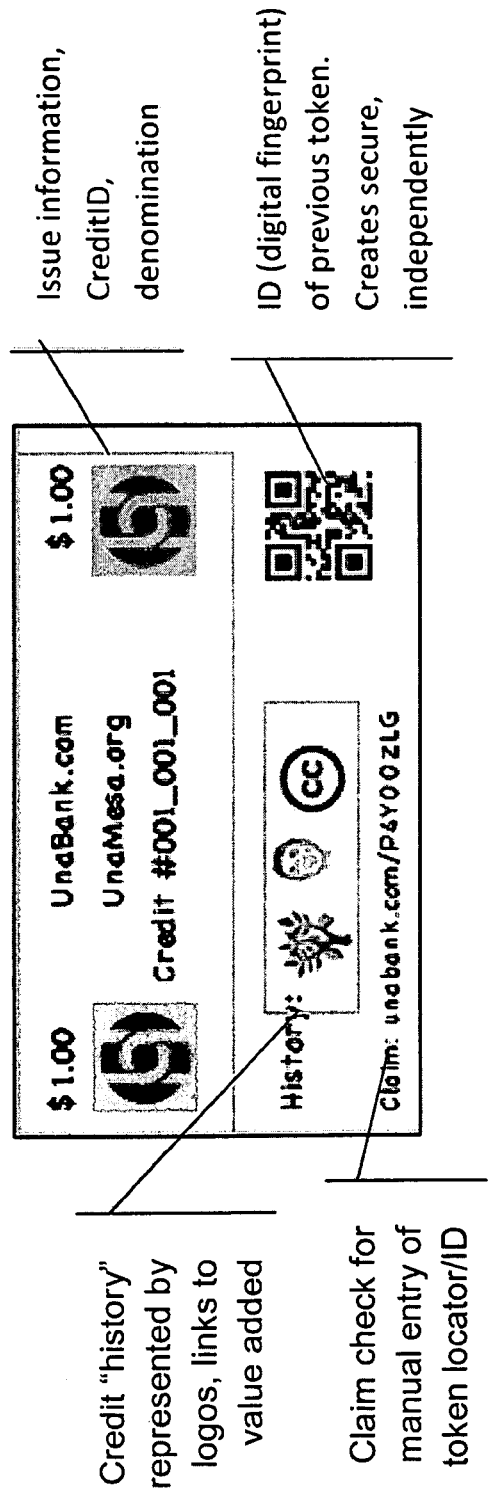
FIG. 6 is a graphical representation of an example of another token according to the present invention.

Figure 5: Tokens
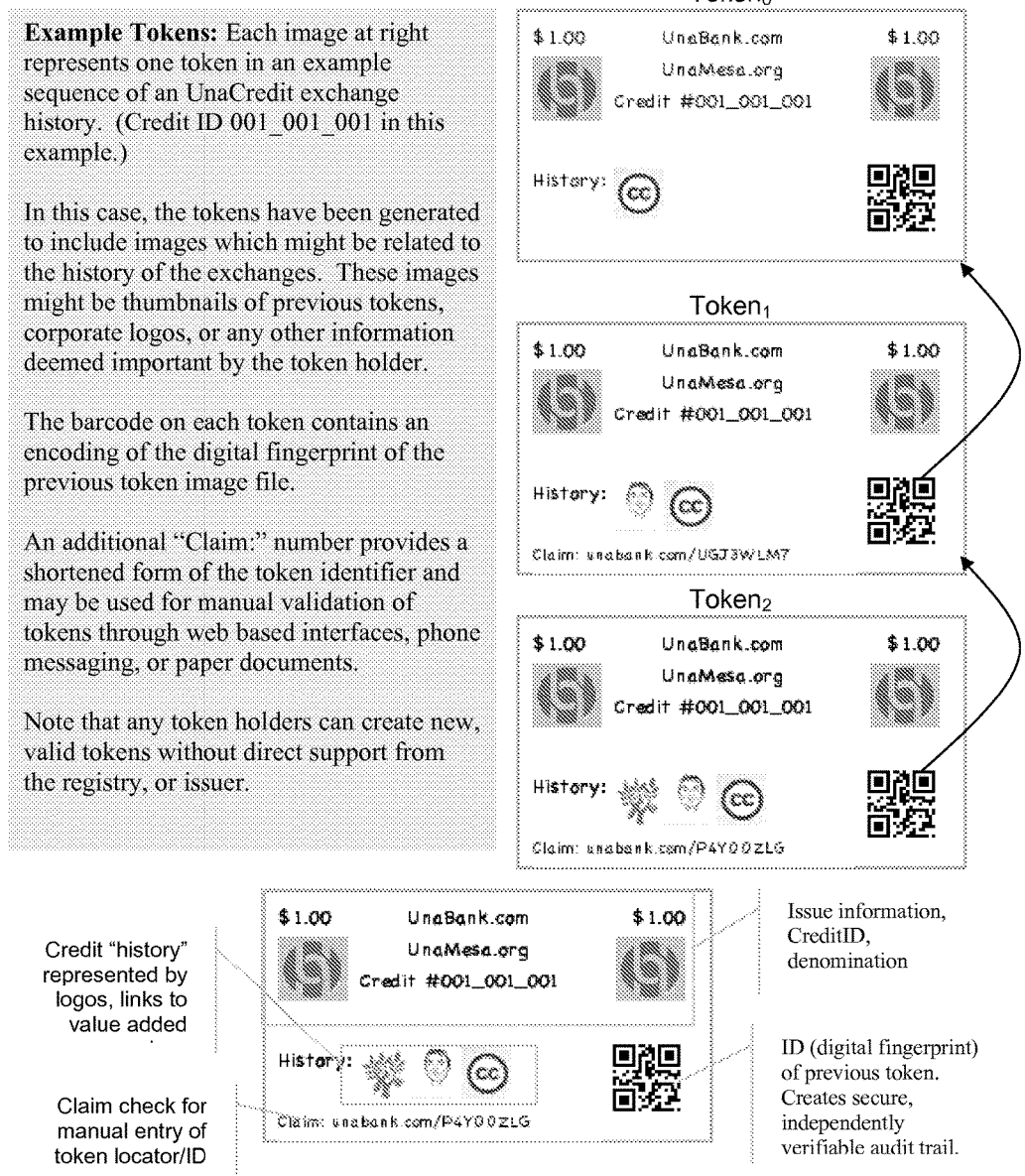

UnaBank Part II
Implementation details
Issuing, Transferring, and Redeeming Credits This section describes in detail the method for issuing, exchanging, verifying, and redeeming UnaBank credits. See Part I for background information on the UnaBank model for service exchange.

Goals for this implementation include:
- Local, distributed control of credits and exchange mechanisms for maximum flexibility
- Minimize transaction costs and overhead to minimize expenses
- Public, manually verifiable accounting and audit trails for maximum trust
- Independence of any specific technologies or vendors

Introduction

UnaBank uses secure, immutable log entries to maintain an independently verifiable history of transactions. The most recent registered entry for an account or an individual credit can always be retrieved from the UnaBank website. Each of these entries contains a secure, immutable reference or "fingerprint" representing the entire history of that account.

The master list of transactions for the UnaBank contains an entry for each credit that is issued or redeemed.

The following sections provide detailed implementation information on the UnaBank transaction mechanisms and how third parties can verify the validity of a history, check whether a current credit token is valid, and register an exchange of a credit. Note that specific details of this implementation may change but the general properties of independent verification should always be preserved.

The first section below lays out the terminology and notation. It is assumed that the reader has basic familiarity with secure hash functions, in particular SHA1 and MD5.

The next section lays out the various procedures for issuing, generating, verifying, transferring, and redeeming credits. At each stage, a credit is represented by a token -- an image which can be viewed on a computer screen in a webpage or can be printed on a piece of paper. The section below on methods of transfer provides details of how individuals may exchange credits through e-mail, websites, SMS messaging, or through printed pages.

Terminology and Notation s represents an arbitrary string encoded in UTF-8 format
H(s) the value of a secure hash algorithm, sha1 by default, applied to the string represented by s
0xs shorthand notation for the hexadecimal encoding of H(s)
$t_i$ a string representing the details of the $i^{th}$ transaction

*Credits*

UnaBank issues UnaCredits in the form of graphic tokens which can be traded and redeemed with the UnaBank. In most cases we refer to an UnaCredit as simply a credit, and the corresponding graphic tokens and credit tokens.

$g_i$ represents the $i^{th}$ graphic "credit token" in a standard file format such as portable network graphics (PNG) or JPEG format.

$0xg_i$ the hexadecimal representation of the hash digest of the bytes comprising the credit token graphic $e_i = (t_{i+1}, 0xg_i)$ the $i^{th}$ exchange entry which is used to represent and verify the transfer of a credit token. For a valid graphic, $g_{i+1}$, $0xe_i$ will be encoded in $g_{i+1}$. An exchange entry is generated to initiate an exchange and the identifier for the exchange entry is embedded into the graphic token used for the exchange.

q(s) a graphic "barcode," for example a QR code, representing the string s. A valid graphic token, $g_i$ will contain a barcode containing the identifier of the previous exchange entry, $0xe_{i-1}$. Note that because $e_i$ contains the previous token id, $0xg_{i-1}$, this barcode creates an "unbreakable link" between the current graphic token, g, and the previous token $g_{i-1}$.

$q^{-1}(g)$ represents the string, normally the identifier of the previous exchange entry (transaction details and token identifier), extracted from the barcode contained in the graphic g

$c_i = (t_i, 0xg_i)$ the $i^{th}$ entry in the history of a credit. This is the information used to verify that an exchange has taken place and register a new token identifier for the associated credit.
For a valid history, each entry should consist of the concatenation of the string representing the transaction and the identifier of the corresponding token graphic. This credit history forms a "self verifying" audit trail. If $g_i$ is a valid token, then $0xe_{i-1}=q^{-1}(g_i)$ is the identifier of the previous exchange entry, where $0xe_{i-1}=H(t_i, 0xg_{i-1})$. The same can be shown for $g_{i-1}$ and the process can be continued until the beginning of the chain corresponding to the initial token issued by the UnaBank is reached.

$0xc_i$ is the identifier for the $i^{th}$ entry in the history of a credit. This is the hex digest of the hash of $(t_i, 0xg_i)$. Note that as an additional validation mechanism, each $t_j$ may include a reference to $0xc_i$ and $g_j$ includes $q(0xt_j)$ where $i=j-1$.

$C_d = \{c_0,...,c_n\}$ the set of entries comprising the history of credit d. For most of this paper we will be discussing only a single credit history, so the subscript d will not be explicitly stated.

$LOC_d$ represents the location of the history of credit d as a string containing the URL where the most recent entry in the transaction history may be retrieved. For the purpose of this paper, assume $LOC_d$ = http://credits.unabank.com/DENOM_ISSUE.log, where DENOM represents the denomination of the credit and ISSUE is the serial number of the credit. At any point in time, the most recent entry in this credit's transaction history, $c_i$ may be retrieved from this URL.

$ID_d = 0xLOC_d$, the preferred unique identifier for credit d. By convention, the first entry in the credit history, $c_0 = (LOC_d, ID_d,)$

Master transaction history

The master transaction history follows the same format as the history for individual credits except that the individual entries do not contain graphic tokens, but simply the hash digest of a given credit entry and the hash digest of the previous entry in the master transaction history.

$u_i = (0xc_n, 0xu_{i-1})$ the $i^{th}$ entry in the master transaction history. For a valid history, each entry should consist of the concatenation of the hash of a credit history entry, $0xc_n$ and the identifier of the previous entry in the master history, $0xu_{i-1}$
$U = \{u_0,...,u_n\}$ the set of entries in the master history $LOC_U$ represents a string containing the URL where the most recent entry in the UnaBank master transaction history may be retrieved. For the purpose of this paper, assume $LOC_U$ = http://transactions.unabank.com/master.log. At any point in time, the most recent entry in the transaction history, $u_i$, may be retrieved from this URL.
$ID_U = 0xLOC_U$, the identifier of the master transaction history.

Issuing, Exchanging, and Redeeming Credit

UnaBank issues credits by creating and publishing the identifier for that credit, making an entry into the master transaction history, and generating an initial token for that credit. In most cases a UnaBank account holder makes a deposit of currency into a UnaBank account to be held in escrow by the UnaBank before the corresponding UnaCredit is issued.

Registered owners of a credit hold the token associated with that credit. They may register a transfer of that credit by generating a new token and registering the token and transaction details with the UnaBank.

At any time, the currently registered token for a credit may be submitted to the UnaBank and redeemed. Upon redemption, the corresponding funds held in escrow are deposited into the account for the last registered owner of the credit as specified in the redeemed token.

In each of the sections below we describe the detailed implementation in algorithmic form followed by some discussion.

The methods for establishing accounts for registered owners, depositing funds, calculating hash functions, and other such details are well known in the domain and beyond the scope of this paper.

*Issuing a credit*

Given a denomination, the numerical value of the associated credit, and a serial number or other unique "issuer" identifier for this credit, the issuer (UnaBank) performs the following steps:

- assign a location, $LOC_c$, such as http://credits.unabank.com/DENOM/ISSUE.log, for example http://credits.unabank.com/100_4324.log denotes credit worth 100 units with 4324 as the issuer identifier.
- create the initial credit entry, $c_0$ = ($LOC_c, ID_c$)
- write $c_0$ into a file located at http://credits.unabank.com/0xc$_0$, that is a URL where the final path component contains the tax digest of the entry and the content of the file contains the entry itself. This allows self verification of entry. An entry should be considered invalid if the hash of the entry content does not match the name of the identifier used to retrieve the content.
- Note: for the remainder of the paper, we will drop the leading part of the URL when it is unambiguous and simply refer to entry locations as 0xc$_0$
- store the entry identifier, 0xc$_0$ into $LOC_c$ (/100_4324.log) as the most recent entry for this credit.
- Create the master transaction entry, $u_i$ = (0xc$_{0 \cdot u_i}$-1)
- Store $u_i$ in 0xu$_i$
- store 0xu$_i$ in $LOC_u$, http://transactions.unabank.com/master.log Once these basic steps have been fulfilled, the credit is considered "issued." UnaBank then creates a token and registers the owner of the credit as described in the next section.

*Transferring credits by exchanging tokens*

The UnaBank system of exchange relies on a combination of two independent means for demonstrating "ownership" of an UnaCredit. Full ownership of UnaCredit c requires:
- possession of a valid token g' for c
- ability to produce the transaction details t for the token g currently registered for c

For each issued credit, the UnaBank maintains a public registry of the id most recently registered graphic, 0xg, for credit c. The current holder of a credit may register a new graphic, 0xg$_i$, by presenting g', t, and 0xg$_i$ to the registry. The registry validates the request by checking if all of the following are true:

- 0xg=H(g')
- H(t)=q$^{-1}$(g)
- 0xg$_i$ is a legal token identifier (optionally, g$_i$ may be supplied or available to the registry and verified to contain a valid code H(t$_i$).)

In the simplest case, g and g' are identical. In other words, the holder of g presents g and the associated transaction details, t, to register an exchange. Note that the transaction details may contain secret information known only to the entity which created the registered token.

In more complicated cases, g' may be the end of a sequence of several exchanges which have not yet been registered. Each intervening token may be made available to the registry during the registration process for g' each with a new exchange token. In this case, the first condition above would be replaced by an equivalent statement where they currently registered identifier is an ancestor of g' which can be reached by following the previous token identifier(s) extracted from the transaction details embedded within g' and each intervening token. In this case, all of the intervening transaction details should also be available and verified by the registry.

The next two sections describe the details of:
- generating a token
- registering a token

Generating a token

Given details of a transaction, such as the registered owner, create a formatted string to contain that transaction information, $t_i$ Here is an example:

```
xact_owner: AcctID
xact_msg: this is an example transaction
xact_previous: 0xc_{i-1}
```

Note that the most recent entry identifier, $0xc_{i-1}$, may be retrieved from the canonical location for the credit $LOC_c$

Next, generate graphic $g_i$ which is a standard size PNG file containing the QR code representation of the exchange identifier, that is $q(0xe_{i-1})$. For the initial entry, $g_0$, use $q(0xc_0)$. In other cases, $e_i=(t_{i+1}, 0xg_i)$ while $c_i=(t_i, 0xg_i)$. Encoding $e_{i-1}$ in the graphic token $g_i$ creates an immutable, verifiable link between one graphic token and the previous graphic token for this credit.

This graphic also includes text entries for some or all of the transaction information as well as logo information from UnaBank, the URL for this credit, and other information. This may include the equivalent of a secret password used to authorize registration of the token.
See the appendix for an example. The intention is that in addition to digital verification of these values and linkages, manual inspection of the tokens should show details that are consistent with the transaction information. Creating a sequence of graphic tokens which can be independently verified by manual inspection, helps prevent fraud or exploits based on any weaknesses in the hash algorithms or other processing.

Registering an Owner

Once the transaction information string and graphic have been generated, the token may be registered with the UnaBank by making an entry into the history for this credit. Prior to registration, the registry should verify the information provided by the registrant against the token id currently registered for the specified credit. This authentication process is outlined above.

To register a new token identifier for a credit:
- If $g_i$ is provided, calculate $0xg_i$ and store the PNG file in the corresponding URL, http://credits.unabank.com/0xg_i.png  (If the registrant provides only $0xg_i$ this step may be delayed until a future registration provides $g_i$.)
- Create the entry $c_i = (t_i, 0xg_i)$
- Store $c_i$ in $0xc_i$
- Store $0xc_i$ into $LOC_c$ At this point, the credit is considered to be registered to AcctID as specified in the registration request. Usually the corresponding graphic, $g_i$ is sent to the account holder of record and/or the entity making the request for the token.

Redeeming a credit

Given a token graphic, $g_r$, transaction details, $t_r$, and the credit identifier, $c$, UnaBank first checks to see if the graphic corresponds to the most recent entry in the history for that identifier.

- calculate $0xg_r$
- retrieve $0xc_n$, where $0xc_n$ is the entry retrieved from $LOC_c$
- if not $0xg_n = 0xg_r$, then report a verification error and stop the redemption process
- create a modified graphic $g'_r$ which contains an overlay of the words REDEEMED and store in $0xg'_r$
- verify that $g_r$ contains $0xt_r$
- retrieve the account ID from $t_r$
- create a new transaction entry, $t'_r$
- create $c_r = (t'_r, 0xg'_r)$
- store $c_r$ in $0xc_r$
- create $u_n = (0xc_r, 0xu_{n-1})$ and store in $0xu_n$
- transfer funds to account ID At this stage, the credit is considered to be redeemed and any further requests for exchanges or redemptions should be denied.

Note: during the redemption phase, the UnaBank may place a hold on the credit $LOC_c$ which prevents the history for that credit from being changed or modified. During the very short interval during which the history is being validated, attempts to add additional events to the history may fail. Alternatively, the verification process may first retrieve and store the most recent entry, validate the history, and then recheck to ensure that the most recent entry is still the same entry before redeeming the credit.

Methods of Transferring Tokens and Validating Credits

This section includes details of exchanging tokens through various transport mechanisms. It also describes procedures that may aid participants in validating tokens prior to completing exchanges. In all cases, we assume that the communication between sender and receiver will include some identifier which indicates the UnaCredit being transferred. This may be specified as a URL denoted by $LOC_c$

*E-mail*

A graphic token $g_i$ is sent as an attachment to an e-mail. The associated transaction details may be sent separately, possibly upon acceptance of the terms of the exchange. The recipient may verify with the UnaBank registry that $0xg_i$ is indeed the currently registered token for the specified credit. The recipient may also verify that he supplied transaction details, $t_i$, correspond to the code embedded within the graphic. This gives the recipient confidence that they have the information necessary to redeem or register a new token identifier for the specified credit.

Note: As a convenience function, the registry may provide e-mail based registration of new tokens. In this case, it may be possible for the sender to simultaneously register the new token by cc'ing the UnaBank registry on the e-mail to the recipient which includes the currently registered token and transaction details. (This mechanism is not recommended in cases where the security of the e-mail channel cannot be guaranteed.)

In this situation, the registry itself may be responsible for creating and registering a new token on behalf of the recipient. The new token may then be sent only to the recipient to guarantee that they have full control over the token. The sender may receive a notification that a new token id has been registered and that the token has been sent to the recipient.

*Web*

The holder of a token embeds a link to the graphic token $g_i$ on a webpage. This link might be an embedded image link within a larger HTML document.

Access to that link might require additional authentication of some type. For example the link might be preauthorized with an access key, or there might be a username and password required to retrieve the link or enclosing HTML page.

The viewer may download the graphic from the specified link, calculate the hash, and compare the results with the currently registered token for the specified credit. Given this information, the viewer can redeem or register a new token for the specified credit. Note that the web-based form for doing so may be included within the viewed HTML page with the required fields pre-filled out for the user. Registration of a credit and generation of a new token for that credit may be completed by a single click on behalf of the viewer. In response, the viewer would get a new link to an HTML page containing a reference to the newly generated credit.

Note that for consistency and efficiency of verification, we recommend that any URL containing a graphic token be specified using 0x$g_i$ as the final component of the pathname (e.g. the filename) which provides an efficient mechanism for verifying the integrity of the file.

Notes on HTML page generation:
- When exchanging a web-based token, the registrant (viewer) may specify the graphic's URL. The UnaBank registry will retrieve the graphic from this URL to use for the verification process.
- When generating a new HTML page containing a newly registered token 0x$g_{i+1}$ the new page may be identical to the previous page except for the link to the new graphic and perhaps substitution of the transaction details if they are included in the page.

SMS

If both sender and receiver are capable of sending multimedia files, then the same approach as e-mail can be used.

In cases where only text is available:
- The token itself can be stored at a protected location by a proxy service
- A sequence of digits can be sent as a claim check to the recipient.
- The recipient sends the claim check to the proxy service along with transaction details and other information.
- The proxy server registers the recipient (identified by their phone number) as the holder of the credit
- Optionally generate a new token to be held at the proxy service. Send the claim check to the registered owner.

Paper

It is possible to print the graphic token on paper. However because of variability in the scanning process, it is not possible to reconstruct the original file, $g_i$, from the printed page.

In this case, we recommend creating a new graphic, g'$_i$, within which the QR code has been replaced by a new QR code containing a URL LOC$g_i$ (containing 0x$g_i$ as part of the path) where the graphic itself, $g_i$ is stored. The new graphic, g'$_i$ can then be printed. When g'$_i$ is scanned, the correct identifier (fingerprint) for the original graphic token can be used as the basis for future exchanges and the original token itself can be retrieved from the URL for registration purposes.

This printed page can then be physically exchanged and traded as a coupon. To avoid ambiguity, we refer to a printed token graphic of this form as a token coupon. Trading multiple copies of the token coupon would be prohibited by terms of the exchange contracts. At any point, the holder of a token coupon can verify its registration status with the registry.

Note that the paper and SMS methods may be combined by printing a short code to be used as a claim check on the token coupon along with a registry phone number and/or URL for verification. The holder may call and enter the short code to verify that it is still the valid, registered graphic identifier.

In this situation, it may be desirable to make the transaction details for a given graphic modifiable and include the "registered phone number" of the token coupon holder. A new folder of the coupon may be registered with the proxy service by entering the current transaction details along with their new transaction details and phone number (perhaps verified by caller ID).

Other authentication mechanisms may include sending an SMS notification to the currently registered holder of the token coupon whenever an exchange request is made. The currently registered holder may take action to block or confirm the transfer. These actions may in turn be included within the credit history at the UnaBank registry.

Verification and Dispute Resolution

Before redeeming a credit, the UnaBank checks to ensure that the credit history is valid and complete. At any point, anyone with knowledge of the credit identifier may check and verify the integrity of the history for that credit, including the currently registered token identifier.

Two types of disputes may arise:
- The integrity of the credit history may not be verifiable due to missing information
- A registrant may dispute a subsequent registration In the first case, the UnaBank may refuse to redeem or transfer a credit until the missing information has been supplied. Alternatively, the UnaBank may specify conditions under which it will transfer or redeem such credits. Usually this will include public notices with a chance for all previous registrants to dispute the registration. Because all of the credit history should be publicly available and stored in distributed locations in addition to storage at the registry, we anticipate that this type of failure will be extremely rare. The exception being loss of the most recently registered token graphic. If the holder of a graphic loses the graphic and the graphic was not yet known to be registry, it may not be possible to regenerate the graphic. This would be the equivalent of losing a dollar bill or other printed currency. As with printed currency, the onus of responsibility lies on the holder of the graphic. However, with the UnaCredit graphic, digital copies are identical to the original and can be stored in a safe place. This makes total loss of the graphic highly unlikely.

In the second case, the holder of a graphic may have a legitimate claim of fraud on behalf of another participant to an exchange. For example if a token holder tries to "double spend" a token. In most cases, the UnaBank should favor the first registrant. To protect against "race conditions" or asymmetries in communication speed, the registry may allow "token locking" where an individual account holder may include proof that they are the holder of a graphic token and request that no registration request involving a token be accepted by any other potential registrant for some period of time. Note that the registry may deny all validation requests during the time that the token is locked or send back a "locked status" response. This signals to potential participants that they should not accept a token until the lock has been released.

In rare cases, the UnaBank registry may need to reverse a registered transaction. Since a credit history must always be externally verifiable, it is not possible to change a credit entry once entered. Any reversals would be entered as new transactions granting the rightful registrant a new token and the transaction details would include a note to the effect that the transaction was due to fraud or an accounting error.[4]

Sponsored Credits

It is possible for registered owners and sponsors to add value to a credit by depositing additional funds in escrow. In recognition of this added value, a graphic representing the logo of the sponsor may be added to subsequent the token graphic(s) for that credit. In addition, the transaction details may include a reference to the website or other identifier provided by the sponsor. Web browsers or other applications which present the graphic to users may use that information to link the sponsor's graphic to the corresponding detailed information.
Similarly when transferring a token using a webpage, the webpage may include links to the sponsoring sites for that credit.

Note that the aggregation of deposits associated with a specific credit provides an object index of the value of the exchanges involving that credit. These aggregate deposits could be used as an indicator of the reputation of the token holder. Registrants of a token may choose to continue displaying a token even after the credit has been passed on to another registrant. Even though the token is no longer valid for exchange it serves as proof of the registrant's participation in the history of exchange involving that credit. Depending on the nature of the exchange participants, previously registered tokens may continue to be used as a mechanism for adding value to the associated credit. One simple mechanism for this includes:
- Sponsor uses a token to register their interest in depositing to a given credit
- The current token holder generates a graphic which includes the sponsors image or logo
- The sponsor makes a deposit into the escrow account for the credit
    - The registry maintains a public list of the current value of the escrow account associated with a credit so that the registrant may verify that the sponsor has deposited the amount as agreed.
    - If no deposit is made within a specified time, the current token holder may register a new graphic which does not include the sponsor's logo.
- Future token graphics may continue to honor this request as illustrated by the tokens in figure 1.

*Aggregation of value*
The ability to carry information about the history of exchanges with zero marginal costs distinguishes the UnaBank exchange from existing market mechanisms. Not only does this provide publicly verifiable audit trails, but provides additional information for participants to evaluate exchanges.

---

[4] Note that the registry has the power to do this even if it does not have access to the currently registered graphic token since a token graphic ID does not become part of the credit history until the associated transaction details have been submitted to the registry. The registry may generate a new token including a pointer to the most recent token ID in the credit history. This may result in the unusual situation where a registered token ID does not eventually appear in the credit history however this does not detract from the integrity or independent verifiability of that history. Still, this situation should be avoided. Whenever possible, the currently registered graphic be used as the basis for the correction.

Aggregation of deposits by sponsors of credit represents just one way in which a credit history may reflect some value in addition to the original face value of the credit. Other transaction details may include information directly valuable to the participants. For example, various components of the details may be used to generate indices of the reputation of the holder or previous registrants.

As another example, credits with a distinguished history of exchange may be preferred to credits of the same denomination and indicate the value of an exchange over and above the redemption value of the escrow account.

Overall, the UnaBank system carries several distinct advantages for exchanges involving professional services. These advantages and the mechanics of exchange may have unexpected consequences for the social and economic norms associated with exchange. Some of these consequences may be positive and some of them may be negative. Adjustments in the operation of the UnaBank should be adjusted as necessary to accelerate and highlight the positive impacts while minimizing any negative consequences. Furthermore one should expect practices to evolve over time as people gain experience with the new mechanisms.

The next section provides some starting points where the UnaBank system promises to improve upon the existing mechanisms for exchange.

UnaBank Part III
Use cases and application scenarios

Improving the quality of exchange

Part I of this document provided motivation for the UnaBank system of exchange. Part II provided concrete implementation details to demonstrate the technical feasibility. In this part, we returned to the initial motivation and discuss some potential use cases. For each we highlight the advantages for the UnaBank approach. In particular these advantages fall into three categories:
- reduced transaction costs including auditing functions
- increased trust and cooperation between parties that benefits both sides
- increased ability for participants to evaluate potential exchanges We examine these advantages within the context of
- knowledge based professional services, including education and health care
- sharing multimedia experiences, including public debates and cultural stories
- research and innovation, including scientific publications
- trading services to be delivered in the future

Information and knowledge sharing

Many underserved communities lack access to high-quality education and health care. Usually these communities have many competing demands for resources and suggestions for improvements. Within these communities, resource allocation decisions can be extremely difficult and highly skewed by political motivations. The use of the UnaBank credits can:
- improve access for community members to public services
- improve the ability of the community to effectively allocate resources to those services which best serve community needs as judged by the choices of community members In the following examples, we imagine that some community members have some number of UnaBank credits which they have purchased or have been provided by an outside agency, such as the World Bank. The education and health care providers in the community are registered public services that can redeem credits in exchange for the escrowed amounts.

Community members holding valid UnaCredit tokens may use those to reward good services. For example, a restaurant customer may give UnaCredit token(s) as a tip for the waiter or waitress. These credits may circulate within the community for some time until the registered holder exchanges them for a public service.

Education

Any local schools should accept UnaCredits as a cash equivalent. In cases where enrollment is free, these credits may be used to pay for textbooks or other resources. They may also be used to reward individual teachers where the escrow amount may be deposited to the teachers account as part of their normal pay.

Healthcare
Similarly clinics and care providers should except in a credits as a cash equivalent. Again the credits may be used as a payment for basic services are resources, or as a gratuity for the doctor or other care provider.

In either case, upon redemption the total amount of credits being redeemed by the various social service agencies will be visible to the community. Individual members will be able to verify that their original deposits were indeed used for social services. Benefits to the individuals within the community include:
- reduced risk of fraud – community members can verify the authenticity and currency of a credit
- potential increase in cash flow within the community -- members may have incentives to engage in more and larger transactions knowing that the money will stay within their community and go towards public services
- visible index of the quality of care providers – the ratio of credits redeemed at the various providers provides a dynamic snapshot of the services considered less valuable to the community
    - individual providers may use their credit redemption history as an objective measure of their reputation

*Sharing multimedia experiences*
The value of a recorded performance, such as a lecture or story told by an elder, can be difficult to judge and may vary dramatically depending on the audience. The UnaBank system can be used to implement a fair pricing and exchange mechanism for recorded materials. This mechanism supports the aggregation of payments across a large number of individuals to enable individuals the rights necessary to share and add value to those recordings.

In the first case below, a "community selling price" has been set for a recording of a public lecture by the copyright owner. The owner has agreed that upon receipt of UnaCredits totaling at least the selling price, the copyright holder will assign the copyright to a public trust on behalf of the community. This example illustrates the power of automatic, publicly verifiable credit histories.

In the second case, a "community value" has been placed on the stories told by elders within a community. This value places additional restrictions on what credits may be accepted in return for the rights to listen to, perform, or distribute the work. This example demonstrates how the credit history can enable exchanges which have multiple, complex mechanisms for evaluation.

Public debates
In this example, we imagine that a television station or other entity has made a recording of a public event, such as a debate between candidates for public office. This entity would like to recover the cost of recording along with some profit. To this end, they set and advertise a "community asking price."
Individuals who listen or view the debate pay for that privilege with UnaCredits. The seller may set a minimum amount of UnaCredits for access. The viewers, or an advertiser or other agent acting on their behalf, can transfer this credit to the seller when the material is viewed or downloaded. After viewing, the viewer may decide to provide additional credits in appreciation of the high quality of the recording.

Potential viewers can examine the credit history which aggregates across all of the credits redeemed by the seller for this material. (When purchasing, the buyer would include sufficient information in the transaction details to associate this exchange with the specific media object.) Individuals can see how close the collected amount is to the requested selling amount. Once a threshold has been passed, community members can verify that the copyright has been transferred to the trust.

This system has the following benefits for participants:
- low cost aggregation of small individual transactions to create a single "purchase"
- reduction of uncertainty for community members wishing to build upon recorded works and therefore increased availability of derivative works relevant to the community's interest
- dynamic index of the community attention and participation in topics of relevance to the community
- increased ability of publishers and authors to recoup their investments in recording materials that serve the public good

Stories of Indigenous cultures

Unlike the previous examples, cultural stories may exist within a very complex tradition of exchange which does not include monetary transactions. In some cultures, very strict rules govern who can view or retell stories.

The UnaBank approach may provide some mechanisms for supporting this type of exchange. In particular, the copyright holder for a story may specify that the story is available for trade only in exchange for credits currently registered to specific community members, or which in the past have been registered to specific community members, for example elders. Because of the public nature of the credit history, this information can be verified before an exchange takes place.

Furthermore, additional conditions on future exchanges of the stories might be attached to the credit history. Although these conditions may not be directly enforced by the UnaBank registry, they can be included within the community's own validation and auditing mechanisms providing for the possibilities of very different models of trust overlaid on the same series of transactions.

Specific benefits include:
- respect and support for existing traditions within a diverse "marketplace"
- fine-grained control over exchanges that value history in addition to hard currency
- increased local exchanges and new indexes for identifying and promoting community wide values

*Building a healthy commons for creativity*

This example considers the problems facing the scientific research community. Currently researchers and their libraries pay large fees to publishers in exchange for access to high-quality journal articles. The quality of these articles comes from the peer review process. Typically this peer review process is performed as a public work by the researchers themselves. Usually the high access fees go solely to administrative costs of the publisher which are not involved in the actual scientific process.

Here we propose using UnaBank credits to pay for journal subscriptions and to reward individuals in the peer review process. Note that many researchers are employed by public institutions, such as universities. These public institutions would be natural services providers, UnaBank account holders who can issue and redeem credits. In using these credits, individuals and institutions can see and manage their balance of accounts with respect to the amount of effort put into publishing and reviewing articles versus the subscription fees paid to access the results.

Public Library of Science

The public library of science (http://www.plos.org) already publishes a number of journals using a model in which the journals themselves are freely available under a creative commons license. In this case, the reviews are paid by the article authors themselves.

With the UnaBank system, we can extend this model by issuing UnaCredits to authors who use these credits to pay for reviews of their articles. Reviewers receive these credits in exchange for performing their reviewing services. Both authors and reviewers can also contribute these credits towards the purchase of subscriptions to journals (either PLOS journals or other commercial journals).

This system provides the following benefits to researchers, publishers, and institutions:
- greater visibility into the research versus non-research (overhead) costs necessary to publish high-quality articles
- better ability to identify efficient and highly rated publications based on the relative ranking of the credits being spent and redeemed with those journals
- better allocation of resources to those journals which create the highest value for researchers
- possibility for community based pricing at the individual article level rather than at the subscription model
    - As with the media sharing example above, the low cost transaction tracking could enable aggregation of payments related to specific articles. Once a threshold is reached, the article may become available for use and reuse without requiring further royalties.

Accumulating credit for documents

We can use this final example of journal articles to highlight one additional case for using UnaBank tokens to track the value of contributions to an evolving document. In this case, the author or another user associates an UnaBank credit with a given document. At each step in the reviewing and publishing process, individuals or sponsoring organizations deposit additional funds into the associated escrow account. At publishing time, the total cumulative credit represents the amount invested in the document. These amounts and the history of the credit can be used, for example, to allocate subsequent earnings of that document to the original contributors.

In outline, the process of accumulating credits for a document or other media object might include:
- Estimated value or cost of authoring deposited into an UnaBank account exchange for issuance of an UnaCredit
  - Initial token embedded within the document or media object
- Reviewer accepts requests to review document in exchange for additional funds being deposited into the associated UnaCredit
  - reviewer may generate an updated token referencing details of the review
  - updated token replaces current token embedded in document
- Publisher decides to publish document
  - additional funds deposited into the associated UnaCredit
  - updated token referencing publishing details embedded in document
- Service organization purchases document
  - redeems associated UnaCredit This outline presents just one example amongst several possibilities. Interesting variations include cases where:
- multiple credits and multiple tokens are associated with a media object
- the proceeds for the purchase of the media object are distributed according to contributions to the escrow fund associated with the document
- reviewers and publishers deposit funds to the escrow account based upon their costs
- "document sponsors" deposit funds to the escrow account in order to solicit reviewing and publishing services

Service Futures

In this final example, we consider the use of UnaCredit to trade for specific services to be delivered at a given time and place. As an example, imagine Alice Tutor purchasing and a credits tied to a tutoring session she promises to give on a date she sets at the time of issuing the initial token. The token might carry a label to the effect of "This token entitles the bearer to a one hour session with Alice Tutor on October 1, 2007 at 10 a.m." One can imagine other service providers, such as Dr. Bob, issuing purchasing similar credits for their services.

Unlike coupons for services, these credits would carry a par or "face value" corresponding to the amount of funds deposited in escrow upon initial issuance. The original depositor, presumably the service provider[5], always has the option of redeeming the token for the face value. That is releasing the funds from a script to the token holder in lieu of providing the specified service. This buyback provision protects the service provider in those situations where they may be unwilling or unable to perform the services as promised.

This buyback option held by the surge of either creates a risk for the token holder who may have paid a market rate well above par for the credit. This risk can be mitigated in several ways.

---

[5] For this example we assumed that the initial deposit or is the service provider, but this need not be the case should the service provider be under a contract to deliver the services on behalf of the depositor.

Most importantly exercising a buyback option should be a public act visible to all trading partners which reflects poorly on the service provider. The negative effect on outstanding and future issues of the provider would be a strong disincentive against exercising buybacks. Most often providers would trade normally in the market for credits they wish to obtain or control.

This "service futures" model which allows trading of credits tied to specific service deliveries creates substantial positive effects for both service recipients and providers. In particular, we can predict the following benefits for both service providers and beneficiaries (token holders):
- reduced scheduling cost by using efficient market mechanisms instead of proprietary calendaring systems with high communication costs
- more efficient allocation of services enabling service recipients to trade "service slots" in order to optimize their service experience
- "service index" which directly measures expected quality of service experience The service index refers to the "market premium" or difference between market rate and par value of a credit. This difference provides a direct measure of the expected value of a service experience for both the holder and the service provider since it expresses both the willingness of the token holder to pay for the credit and the willingness of the service provider to deliver services to the holder. An unwilling provider can always exercise their buyback option.

Calendar interface for account balances and token trading

The service futures example suggests the use of a calendar-based display of tokens for account holders. Each account page for a service provider or trader might display a calendar showing issued and held tokens, one per timeslot. Each token would display the market rate for that token. For service providers, the tokens might also link to the currently registered holder of the credit allowing the providers to assess and, if necessary, exercise their buyback provision.

As an alternative or complementary display for token traders, each account might list the current and previously registered tokens for that account. On one side would be the received tokens. For each token currently held by the account, a "send to" field or a button may appear providing a single click action for sending that token to another account. For previously held tokens, the field next to the received token would hold the "sent" token perhaps with a link to the most recent token associated with that credit.

Tips in exchange for future services

Lastly we return to our example of tipping a waiter or waitress in a restaurant to illustrate how service futures might operate in practice. In this case a restaurant patron might receive a token from the layperson in exchange for a good tip. This token would be tied to the promise of a future meal to be served by the same waitress or waiter. On returning to the restaurant, the patron would produce the token in order to be served by the designated server.
In these cases the original tip might serve as the escrow for the issued credit.

Conclusion

These examples provide just the few ways in which a new system for exchange might create additional value within our service economy. Pricing models based on a dynamic equilibrium point between supply and demand simply don't work particularly well for the exchange of intangibles and knowledge-based services where the "good" itself is created in the act of the exchange. The UnaBank system provides one specific alternative that builds upon the best properties of our existing market mechanisms. This system represents just one among many experiments within society to improve our individual and collective abilities.

In the long run, a more effective model for valuing and fostering social capital will emerge. Whether the UnaBank system or another approach, society desperately needs complements to our existing models of tangible assets and financial capital in order to meet the tremendous challenges we face in combating global warming to build a healthy environment, eliminate deaths to the curable diseases, and ensure quality education for every citizen. We offer this document in the hopes that the ideas presented here may provoke thought and facilitate collective actions that bring us closer to these goals.

UnaBank Appendix

System Diagram

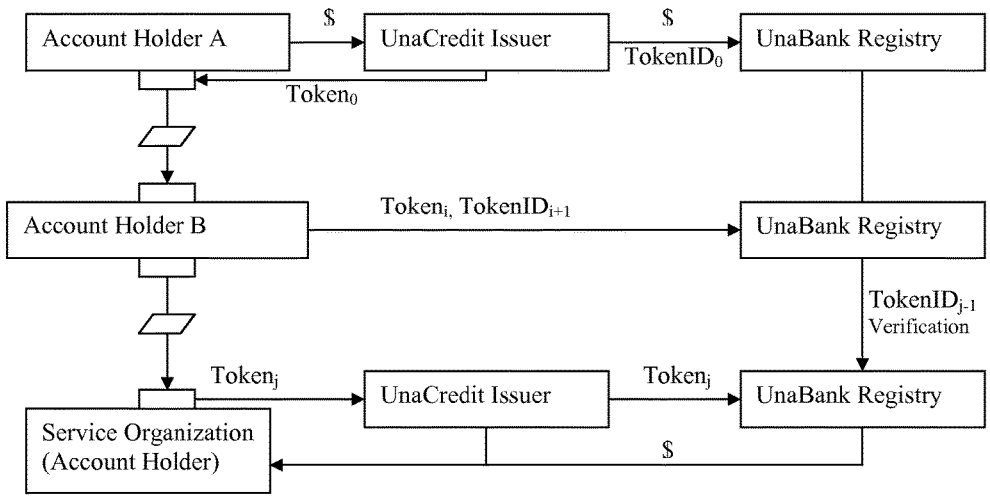

Figure 7:
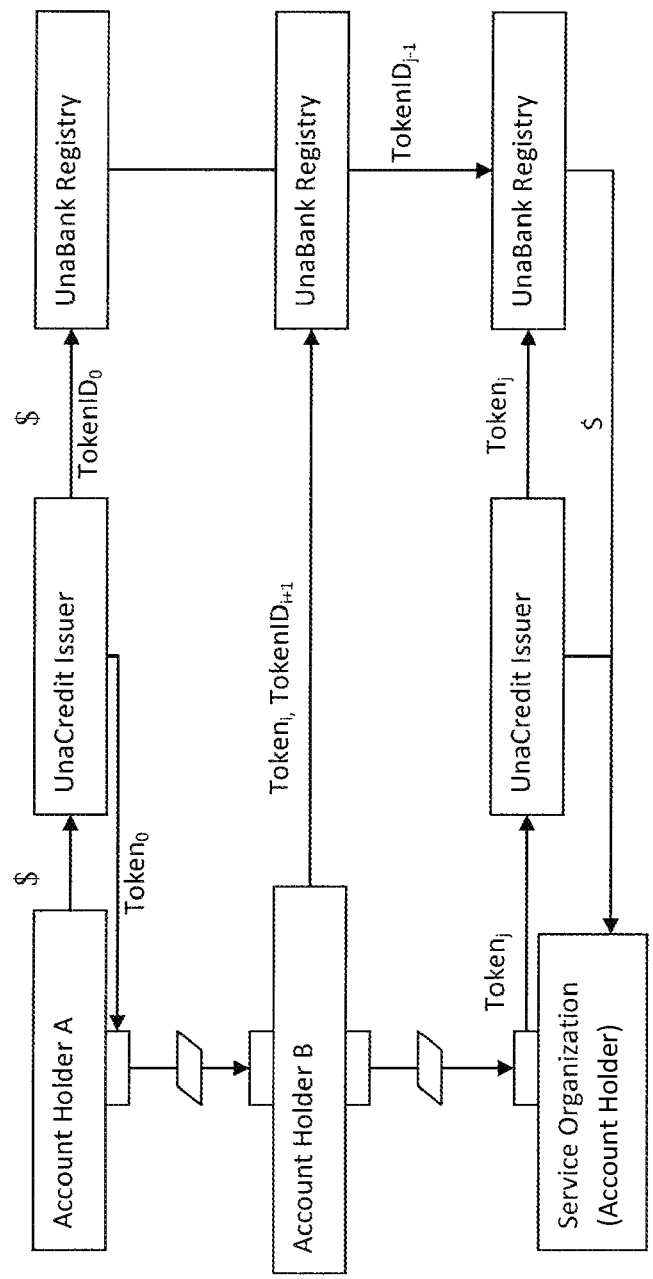
FIG. 7 is a block diagram of another embodiment of a system for exchanging, sharing and redeeming credits according to the present invention.

Figure 7 Using tokens in the Service exchange system
Credits are issued to account holders upon deposit of funds. Funds are held in escrow until redeemed by a service organization. For each credit, the issuer generates an initial token for the account holder and registers the token identifier, or "digital fingerprint," with the registry.

The token is a unique digital file, usually a graphical image, which may be given to another party. At any time, a token holder may generate a new token, which embeds a reference to the previous token identifier. Registering the new token identifier requires the registrant to present the current token. Once a token identifier has been registered, the previous tokens in chain become publicly visible in the registry archive to allow independent verification of the transaction history.

Only the token associated with the currently registered token identifier may be used to register or redeem a credit. New tokens may be created and registered by any current token holder. However, the credit issuer or registry may impose additional constraints on which accounts may redeem tokens. As presented here, organizations eligible for redemption may be limited to those providing public services.

Glossary of terms

- Service Exchange A combination of accounting techniques and trading mechanisms particularly well-suited to the exchange and valuation of services.
- Qualified public service organizations Constraints may be placed on the nature and type of entities that may redeem credits to claim the escrowed funds. Usually these organizations deliver services related to education, health care, or other social services.
- Value-added services Brokers or other providers may facilitate interactions and location of information related to exchanges. These services may be reflected in the tokens themselves. For example information links or even advertising on the tokens may provide value to the traders. These services become part of the history of the exchange and many include the addition of funds to the escrow related to a credit. They may also involve payments to the issues and/or registry.
- UnaMesa, UnaBank, UnaCredits The UnaMesa Association is a charitable organization that supports team-based public services. UnaBank refers to an entity operating as a public trust to issue credits, register identifiers, and otherwise support the service exchange. The UnaMesa Association may eventually operate such a service. UnaCredits are the term for credits backed by an escrow of funds and represented by circulating tokens.
- Token A digital file, usually an image file, which includes an embedded reference to a "previous" token identifier. Technically a token can be any string of digits.
- Token identifier A number which is unique to a particular digital file. Also called a digital fingerprint.
- Digital Fingerprint The output of a cryptographic "hash" function such as SHA1 which computes a unique identifier for a given digital file. The original file cannot be computed from this output.
- Issuer An entity which accepts funds to be held in escrow and issues credits in return.
- Account holder An individual or organization which deposits funds with the UnaBank in exchange for registered tokens.
- Registry A public trust which maintains a list of the most current registered token identifier for a given credit, as well as an archive of previously registered tokens.
- Complementary currency Alternative currency mechanisms such as Ithaca dollars and Time banks which are designed to facilitate the creation of social capital. UnaCredits have a similar purpose but differ significantly from the existing models.
- Social capital As used in this paper, social capital refers to relationship-based capabilities within a society which are not adequately served by existing market mechanisms.
- Transaction costs The costs or effort required participate in an exchange. UnaCredit tokens minimize the transaction costs by incorporating accounting mechanisms directly into the exchange process.
- Audit trail Documents describing a sequence of interactions. For tokens auditing information is embedded within the tokens themselves.
- Digital paper trail A digital audit trail. Unlike paper documents, digital files can normally be modified without leaving a trace. However, the accounting and token generation mechanisms described herein provide the equivalent of a paper trail for digital files. In particular, token files cannot be changed without leaving a trace in the history – the sequence of tokens -- for a specific credit.
- Escrow Funds that are held on behalf of parties to the transaction. In the case of UnaCredits, these funds provide a direct backing and guarantee on the value of the credits.
- UnaCredit history A sequence of tokens representing that credit, along with information directly associated with the exchanges of those tokens.
- Independent verifiability Given a token, anyone can check and validate an UnaCredit history ending with that token. The verification process does not require any information from the registry or any other third parties.

What is claimed is:

1. A method for generating tokens, performed on one or more computing devices, the method comprising:
   receiving, on the one or more computing devices, first token image data corresponding to a first graphical token, the first graphical token corresponding to a first unit of currency;
   calculating a first token identifier based on a secure hash of the first token image data;
   creating a first machine readable image corresponding to the first token identifier;
   compositing, on the one or more computing devices, the first machine readable image onto a template image to create second token image data for a second graphical token, the second graphical token corresponding to a second unit of currency, the first graphical token and the second graphical token associated with a sequence of tokens representing a store of value that is denominated in a currency; and
   embedding a digital fingerprint within the first machine readable image to create a link from the second graphical token to the first graphical token in the sequence of tokens.

2. The method of claim 1 wherein the template image is derived from the first token image data.

3. The method of claim 1 wherein the template image includes a graphic specific to an exchange transaction.

4. The method of claim 1 wherein the first machine readable image includes a QR code.

5. The method of claim 1 wherein the first token identifier is an output of a SHA1 hash function applied to a data stream including the first token image data.

6. The method of claim 1 wherein the first machine readable image includes data specific to an exchange transaction.

7. The method of claim 1 further comprising a step of verifying an authenticity of the first token image data before creating the second token image data.

8. A non-transitory computer readable medium with encoded instructions thereon, that in response to execution by a computing device, cause the computing device to perform operations comprising:
   receiving first token image data corresponding to a first graphical token, the first graphical token corresponding to a first unit of currency;
   calculating a first token identifier based on a secure hash of the first token image data;
   creating a first machine readable image corresponding to the first token identifier;
   compositing the first machine readable image onto a template image to create second token image data for a second graphical token, the second graphical token corresponding to a second unit of currency, the first graphical token and the second graphical token associated with a sequence of tokens representing a store of value that is denominated in a currency; and
   embedding a digital fingerprint within the first machine readable image to create a link from the second graphical token to the first graphical token in the sequence of tokens.

9. The non-transitory computer readable medium of claim 8, wherein the template image is derived from the first token image data.

10. The non-transitory computer readable medium of claim 8, wherein the template image includes a graphic specific to an exchange transaction.

11. The non-transitory computer readable medium of claim 8, wherein the first machine readable image includes a QR code.

12. The non-transitory computer readable medium of claim 8, wherein the first token identifier is an output of a SHA1 hash function applied to a data stream including the first token image data.

13. The non-transitory computer readable medium of claim 8, wherein the first machine readable image includes data specific to an exchange transaction.

14. The non-transitory computer readable medium of claim 8, wherein the encoded instructions further cause the computing device to perform an operation of:
   verifying an authenticity of the first token image data before creating the second token image data.

* * * * *